US012353836B2

(12) United States Patent
Ozeki

(10) Patent No.: US 12,353,836 B2
(45) Date of Patent: Jul. 8, 2025

(54) LEARNING METHOD AND DEVICE, PROGRAM, LEARNED MODEL, AND TEXT GENERATION DEVICE

(71) Applicant: FUJIFILM Corporation, Tokyo (JP)

(72) Inventor: Makoto Ozeki, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 766 days.

(21) Appl. No.: 17/475,833

(22) Filed: Sep. 15, 2021

(65) Prior Publication Data

US 2022/0004719 A1 Jan. 6, 2022

Related U.S. Application Data

(63) Continuation of application No. PCT/JP2020/016556, filed on Apr. 15, 2020.

(30) Foreign Application Priority Data

Apr. 24, 2019 (JP) ................. 2019-083057

(51) Int. Cl.
*G06N 20/00* (2019.01)
*G06F 18/214* (2023.01)
(Continued)

(52) U.S. Cl.
CPC ............ *G06F 40/40* (2020.01); *G06F 18/214* (2023.01); *G06F 18/251* (2023.01); *G06N 20/00* (2019.01);
(Continued)

(58) Field of Classification Search
CPC ...... G06V 10/454; G06V 10/40; G06V 10/98; G06V 20/70; G06V 2201/10;
(Continued)

(56) References Cited

U.S. PATENT DOCUMENTS

2017/0206435 A1* 7/2017 Jin ..................... G06F 18/2431
2019/0377979 A1 12/2019 Jiang et al.

FOREIGN PATENT DOCUMENTS

CN 105989067 A 10/2016
CN 108073941 A 5/2018
(Continued)

OTHER PUBLICATIONS

Vinyals, Oriol, et al. "Show and tell: A neural image caption generator." 2015 IEEE Conference on Computer Vision and Pattern Recognition (CVPR). IEEE, 2015. (Year: 2015).*
(Continued)

*Primary Examiner* — Vu Le
*Assistant Examiner* — Tracy Mangialaschi
(74) *Attorney, Agent, or Firm* — Studebaker Brackett PLLC

(57) ABSTRACT

Provided are a learning method and device of a model used for processing of automatically generating a text from an image, a program, a learned model, and a text generation device. In a learning method according to an embodiment of the present disclosure, a learning model including a feature amount extraction unit that extracts an image feature amount from an image, a text generation unit that generates an estimated text from the image feature amount, and a statistic estimation unit that generates an estimated image statistic from the text is used, and a combination of a first image, first metadata, and a first text is used as learning data. A first error of a first estimated text estimated from a first image feature amount of the first image, a second error of a first estimated image statistic estimated from the first text, and a third error of a second estimated image statistic estimated from the first estimated text are calculated, and a parameter of the learning model is updated.

13 Claims, 21 Drawing Sheets

(51) Int. Cl.
  *G06F 18/25* (2023.01)
  *G06F 40/40* (2020.01)
  *G06V 10/40* (2022.01)
  *G06V 10/98* (2022.01)
  *H04L 51/52* (2022.01)

(52) U.S. Cl.
  CPC .............. *G06V 10/40* (2022.01); *G06V 10/98* (2022.01); *H04L 51/52* (2022.05)

(58) Field of Classification Search
  CPC ...... G06F 18/214; G06F 18/10; G06F 18/251; G06F 40/40; G06N 3/084; G06N 3/045; G06N 20/00; G06T 7/00; H04L 51/52; H04L 51/066
  See application file for complete search history.

(56) References Cited

FOREIGN PATENT DOCUMENTS

| CN | 108305296 A | 7/2018 |
|---|---|---|
| WO | 2016/033710 A1 | 3/2016 |

OTHER PUBLICATIONS

Verma, Yashaswi, and C. V. Jawahar. "A support vector approach for cross-modal search of images and texts." Computer Vision and Image Understanding 154 (2017): 48-63. (Year: 2017).*

Oriol Vinyals et al., "Show and Tell: A Neural Image Caption Generator", arXiv:1411.4555v2, Apr. 20, 2015.

Yoshitaka Ushiku, "Automatic generation of image caption" [search on Dec. 22, 2018], Internet <URL: https://www.slideshare.net/YoshitakaUshiku/ss-57148161>.

Bo Dai et al., "Towards Diverse and Natural Image Descriptions via a Conditional GAN", arXiv:1703.06029v3, Aug. 11, 2017.

Tatsuya Harada, "Advances in Machine Learning", Journal of the Japan Society for Simulation Technology, Dec. 2015, pp. 240-246, vol. 34, No. 4.

Kenki Nakamura et al., "Context-aware Image Generation by using Generative Adversarial Networks", The 9th forum on data engineering and information management (The 15th annual conference of the Database Society of Japan), 2017.

Yoshitaka Ushiku, "The forefront of visual and language amalgamation", The journal of the Institute of Image Information and Television Engineers, 2018, pp. 650-654, vol. 72, No. 5.

International Search Report issued in PCT/JP2020/016556; mailed Jul. 14, 2020.

International Preliminary Report On Patentability and Written Opinion issued in PCT/JP2020/016556; issued Sep. 28, 2021.

An Office Action mailed by China National Intellectual Property Administration on Jun. 8, 2024, which corresponds to Chinese Patent Application No. 202080030768.7 and is related to U.S. Appl. No. 17/475,833; with English language translation.

* cited by examiner

LEARNING METHOD AND DEVICE, PROGRAM, LEARNED MODEL, AND TEXT GENERATION DEVICE

CROSS-REFERENCE TO RELATED APPLICATIONS

The present application is a Continuation of PCT International Application No. PCT/JP2020/016556 filed on Apr. 15, 2020 claiming priority under 35 U.S.C § 119(a) to Japanese Patent Application No. 2019-083057 filed on Apr. 24, 2019. Each of the above applications is hereby expressly incorporated by reference, in its entirety, into the present application.

BACKGROUND OF THE INVENTION

1. Field of the Invention

The present invention relates to a learning method and device, a program, a learned model, and a text generation device, and more particularly to machine learning technology, image processing technology, and natural language processing technology for realizing the generation of a text related to an image.

2. Description of the Related Art

The technology disclosed in Oriol Vinyals, Alexander Toshev, Samy Bengio, Dumitru Erhan "Show and Tell: A Neural Image Caption Generator", arXiv:1411.4555 is known as technology for automatically generating an image caption of an image. Oriol Vinyals, Alexander Toshev, Samy Bengio, Dumitru Erhan "Show and Tell: A Neural Image Caption Generator", arXiv:1411.4555 proposes an image caption generator in which a convolutional neural network (CNN) that extracts an image feature from the image and a recurrent neural network (RNN) that generates a caption in a natural language based on the extracted image feature amount are combined. Note that the caption is included in a concept of a text.

In Yoshitaka Ushiku "Automatic generation of image caption" [search on Dec. 22, 2018], Internet <URL: https://www.slideshare.net/YoshitakaUshiku/ss-57148161>, automatic generation technology of an image caption in the related art is generally summarized.

In Bo Dai, Sanja Fidler, Raquel Urtasun, Dahua Lin "Towards Diverse and Natural Image Descriptions via a Conditional GAN", arXiv:1703.06029, a study is disclosed in which a conditional generative adversarial network (GAN) is used to add an input other than an image, in a case of learning, and output various writing styles from one model.

SUMMARY OF THE INVENTION

In order to obtain a text generation model for automatically generating a text corresponding to an image, it is conceivable to perform machine learning by using data of a pair of an image for learning and a correct text corresponding to the image. However, since a degree of freedom of the expression of the text corresponding to the image is large, there is a problem that a learning method in the related art has a slow convergence of parameters of the learning model, and/or an accuracy of inference of the text generation model obtained by learning is insufficient.

The present invention has been made in view of such circumstances, and is to provide a learning method and device, a program, a learned model, and a text generation device, which can improve an accuracy of inference of a model used in processing of automatically generating a text from an image.

An aspect of the present disclosure relates to a learning method comprising using a learning model including a feature amount extraction unit that extracts an image feature amount from an image, a text generation unit that generates an estimated text related to the image based on the image feature amount, and a statistic estimation unit that receives an input of the estimated text or a correct text, estimates an image statistic corresponding to the input text, and generates an estimated image statistic, receiving an input of a plurality of learning data in which a first image for learning and a first text as the correct text for the first image are combined, inputting the first image into the feature amount extraction unit to acquire a first image feature amount, inputting the first image feature amount into the text generation unit to acquire a first estimated text, calculating a first error between the first estimated text and the first text, inputting the first text into the statistic estimation unit to acquire a first estimated image statistic, calculating a second error between the first estimated image statistic and a first image statistic calculated from the first image, inputting the first estimated text into the statistic estimation unit to acquire a second estimated image statistic, calculating a third error between the second estimated image statistic and the first image statistic, updating a parameter of the statistic estimation unit based on the second error, and updating at least a parameter of the text generation unit based on the first error and the third error.

In the learning method according to this aspect, the learning model in which the text generation unit and the statistic estimation unit are combined is used, and learning between the text generation unit and the statistic estimation unit is performed in parallel. According to this aspect, a mechanism is introduced to update the parameter of the text generation unit by using the third error between the first estimated image statistic, which is estimated by the statistic estimation unit based on an estimation result of the text generation unit, and a correct first image statistic, and for the generation of a text having a high degree of freedom, learning is performed in which the restriction of the image statistic is added. As a result, it is possible to obtain a model capable of generating a highly accurate text from the provided image.

The update timing of the parameter of the text generation unit based on the first error and the update timing of the parameter of the text generation unit based on the third error may be different timing or simultaneous timing. In addition, the update timing of the parameter of the text generation unit and the update timing of the parameter of the statistic estimation unit may be different timing or simultaneous timing.

In the learning method according to another aspect of the present disclosure, the text generation unit may be a module that generates the estimated text from the image feature amount and metadata related to a user associated with the image, the learning model may further include a metadata estimation unit that receives an input of the estimated text or the correct text, estimates metadata of the user corresponding to the input text, and generates estimated metadata, the learning data may further include first metadata related to a first user associated with the first image, the first image feature amount and the first metadata may be input into the text generation unit to acquire the first estimated text, the learning method may further comprise inputting the first text into the metadata estimation unit to acquire first estimated metadata, calculating a fourth error between the first estimated metadata and the first metadata, updating a parameter of the metadata estimation unit based on the fourth error, inputting the first estimated text into the metadata estimation unit to acquire second estimated metadata, and calculating a fifth error between the second estimated metadata and the first metadata, and at least the parameter of the text generation unit may be updated based on the fifth error.

According to this aspect, it is possible to change a writing style of the generated text based on an attribute of the user and generate the text close to the intention of the user.

In the learning method according to still another aspect of the present disclosure, the first user may correspond to at least one of a photographer of the image, a creator thereof, a contributor thereof, a provider thereof, or an owner thereof, and the first metadata may include information indicating an attribute of the first user.

The learning method according to still another aspect of the present disclosure, the first text may include a sentence created by the first user.

The learning method according to still another aspect of the present disclosure, the first image may be an image posted to a social networking service by the first user, the first text may be a sentence posted to the social networking service by the first user, and the first metadata may include at least a part of user information of the first user registered in the social networking service.

The learning method according to still another aspect of the present disclosure, the first image may be an image obtained by converting an email received by the first user into image information, and the first text may include a sentence of an email transmitted by the first user.

The learning method according to still another aspect of the present disclosure, may further comprise updating a parameter of the feature amount extraction unit based on the first error.

The learning method according to still another aspect of the present disclosure, the learning model may be constituted by a hierarchical neural network.

Still another aspect of the present disclosure relates to a program that causes a computer to execute processing of the learning method according to any one of the aspects of the present disclosure.

Still another aspect of the present disclosure relates to a learned model, which is the learned text generation unit learned by using the learning method according to any one of the aspects of the present disclosure.

Still another aspect of the present disclosure relates to a text generation device comprising the learned text generation unit learned by using the learning method according to any one of the aspects of the present disclosure, and the feature amount extraction unit.

Still another aspect of the present disclosure relates to a learning device comprising a learning data acquisition unit that receives input of a plurality of learning data in which a first image for learning and a first text as a correct text for the first image are combined, a learning model trained by the learning data, the learning model including a feature amount extraction unit that extracts an image feature amount from an input image, a text generation unit that generates an estimated text related to the image based on the image feature amount, and a statistic estimation unit that receives an input of the estimated text or the first text, estimates an image statistic corresponding to the input text, and generates an estimated image statistic, a first error calculation unit that inputs, into the text generation unit, a first image feature amount obtained from the feature amount extraction unit by inputting the first image into the feature amount extraction unit to calculate a first error between a first estimated text obtained from the text generation unit and the first text, a second error calculation unit that calculates a second error between a first estimated image statistic obtained from the statistic estimation unit by inputting the first text into the statistic estimation unit and a first image statistic calculated from the first image, and calculates a third error between a second estimated image statistic obtained from the statistic estimation unit by inputting the first estimated text into the statistic estimation unit and the first image statistic, and a parameter update unit that updates parameters of the text generation unit and the statistic estimation unit based on the first error and the second error, and updates at least a parameter of the text generation unit based on the third error.

The update timing of the parameter of each of the text generation unit and the statistic estimation unit by the parameter update unit may be different timing or simultaneous timing. The parameter update unit may update the parameter of the text generation unit based on the first error and the third error, and may update the parameter of the statistic estimation unit based on the second error. The parameter update unit may update the parameter of the statistic estimation unit based on the third error.

In the learning device according to still another aspect of the present disclosure, the text generation unit may be a module that generates the estimated text from the image feature amount and metadata related to a user associated with the image, the learning model may further include a metadata estimation unit that receives an input of the estimated text or the first text, estimates metadata of the user corresponding to the input text, and generates estimated metadata, the learning data may further include first metadata related to a first user associated with the first image, the first image feature amount and the first metadata may be input into the text generation unit to acquire the first estimated text, the learning device may further comprise a third error calculation unit that calculates a fourth error between a first estimated metadata obtained from the metadata estimation unit by inputting the first text into the metadata estimation unit and the first metadata, and calculates a fifth error between a second estimated metadata obtained from the metadata estimation unit by inputting the first estimated text into the metadata estimation unit and the first image statistic, and the parameter update unit may update a parameter of the metadata estimation unit based on the fourth error, and updates at least the parameter of the text generation unit based on the fifth error.

Still another aspect of the present disclosure relates to a learning device comprising at least one processor, and a non-transitory computer-readable medium in which a command to be executed by the processor is stored, in which the processor functions as a learning model including a feature amount extraction unit that extracts an image feature amount from an image by executing the command, a text generation unit that generates an estimated text related to the image based on the image feature amount, and a statistic estimation unit that receives an input of the estimated text or a correct text, estimates an image statistic corresponding to the input text, and generates an estimated image statistic, and executes processing including receiving an input of a plurality of learning data in which a first image for learning and a first text as a correct text for the first image are combined, inputting, into the text generation unit, a first image feature amount obtained from the feature amount extraction unit by inputting the first image into the feature amount extraction unit to calculate a first error between a first estimated text obtained from the text generation unit and the first text, calculating a second error between a first estimated image statistic obtained from the statistic estimation unit by inputting the first text into the statistic estimation unit and a first image statistic calculated from the first image, and calculating a third error between a second estimated image statistic obtained from the statistic estimation unit by inputting the first estimated text into the statistic estimation unit and the first image statistic, and updating parameters of the text generation unit and the statistic estimation unit based on the first error and the second error, and updating at least a parameter of the text generation unit based on the third error.

According to the present invention, it is possible to accurately generate a text corresponding to an image.

DESCRIPTION OF THE PREFERRED EMBODIMENTS

A preferred embodiment of the present invention will be described below in detail with reference to the accompanying drawings.

Outline of Text Generation Device According to First Embodiment

Figure 1:
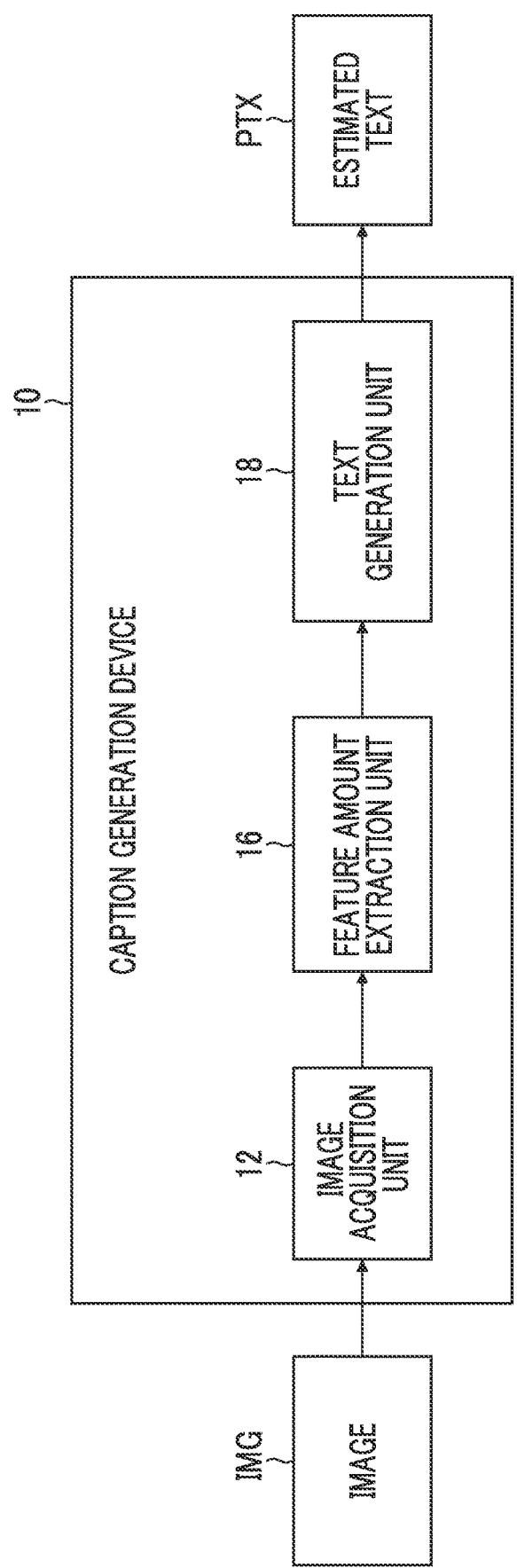
FIG. 1 is a functional block diagram showing an example of a caption generation device according to a first embodiment.

FIG. 1 is a functional block diagram showing an example of a caption generation device according to a first embodiment of the present invention. A caption generation device 10 uses an image IMG as an input, generates an estimated text PTX related to the input image IMG, and outputs an estimated text PTX. For example, the image IMG may be a digital photographic image captured by using an imaging device, a read image read by using a scanner, a captured image such as a screenshot, an illustration created by using a drawing tool, or the like.

The estimated text PTX is a caption corresponding to a content of the image IMG, and is character information expressed in a natural language. The term "text" includes a concept of "caption". The term "text" or "caption" as used in the present specification includes an array of words that convey a unity of meanings, and includes a concept of composition, a sentence, a phrase, or a clause. Characters used in the text may include a symbol, an emoticon, and a pictogram. The term "generate" as used in the present specification includes a concept of the term "estimate".

The caption generation device 10 includes an image acquisition unit 12, a feature amount extraction unit 16, and a text generation unit 18. The caption generation device 10 can be realized by a computer system including one or a plurality of computers. That is, the functions of the image acquisition unit 12, the feature amount extraction unit 16, and the text generation unit 18 can be realized by a combination of hardware and software of the computer. The software is synonymous with "program".

The image acquisition unit 12 is an interface which captures data of the image IMG. The image acquisition unit 12 may be configured by a data input terminal that captures the data of the image IMG from another signal processing unit outside or inside the device. A metadata acquisition unit 14 is an interface which captures data of metadata MTD. The metadata acquisition unit 14 may be configured by a data input terminal that captures the metadata MTD from another signal processing unit outside or inside the device.

In addition, the image acquisition unit 12 may employ a wired or wireless communication interface unit, a media interface unit that performs reading and writing of a portable external storage medium such as a memory card, or an appropriate combination of these aspects.

The image IMG input via the image acquisition unit 12 is transmitted to the feature amount extraction unit 16. The feature amount extraction unit 16 extracts an image feature amount from the input image IMG and outputs the extracted image feature amount. For example, the feature amount extraction unit 16 may be a learned model using a hierarchical neural network represented by a convolutional neural network (CNN). The feature amount extraction unit 16 may use a network portion corresponding to a CNN encoder used for an image classification task and the like.

The "neural network" is a mathematical model of information processing that simulates a mechanism of a cranial nerve system. The processing using the neural network can be realized by using a computer. A processing unit including the neural network can be configured as a program module. In the present specification, the neural network may be simply referred to as a "network".

The image feature amount output from the feature amount extraction unit 16 is transmitted to the text generation unit 18.

The text generation unit 18 generates the estimated text PTX based on the provided image feature amount. The text generation unit 18 is configured by the learning model including the hierarchical neural network, and a function of generating a text from the image is acquired by machine learning using a learning method described below. The caption generation device 10 is an example of a "text generation device" in the present disclosure.

Configuration Example 1 of Learning Device

Hereinafter, a learning method of improving an estimation function of the text generation unit 18 will be described.

Figure 2:
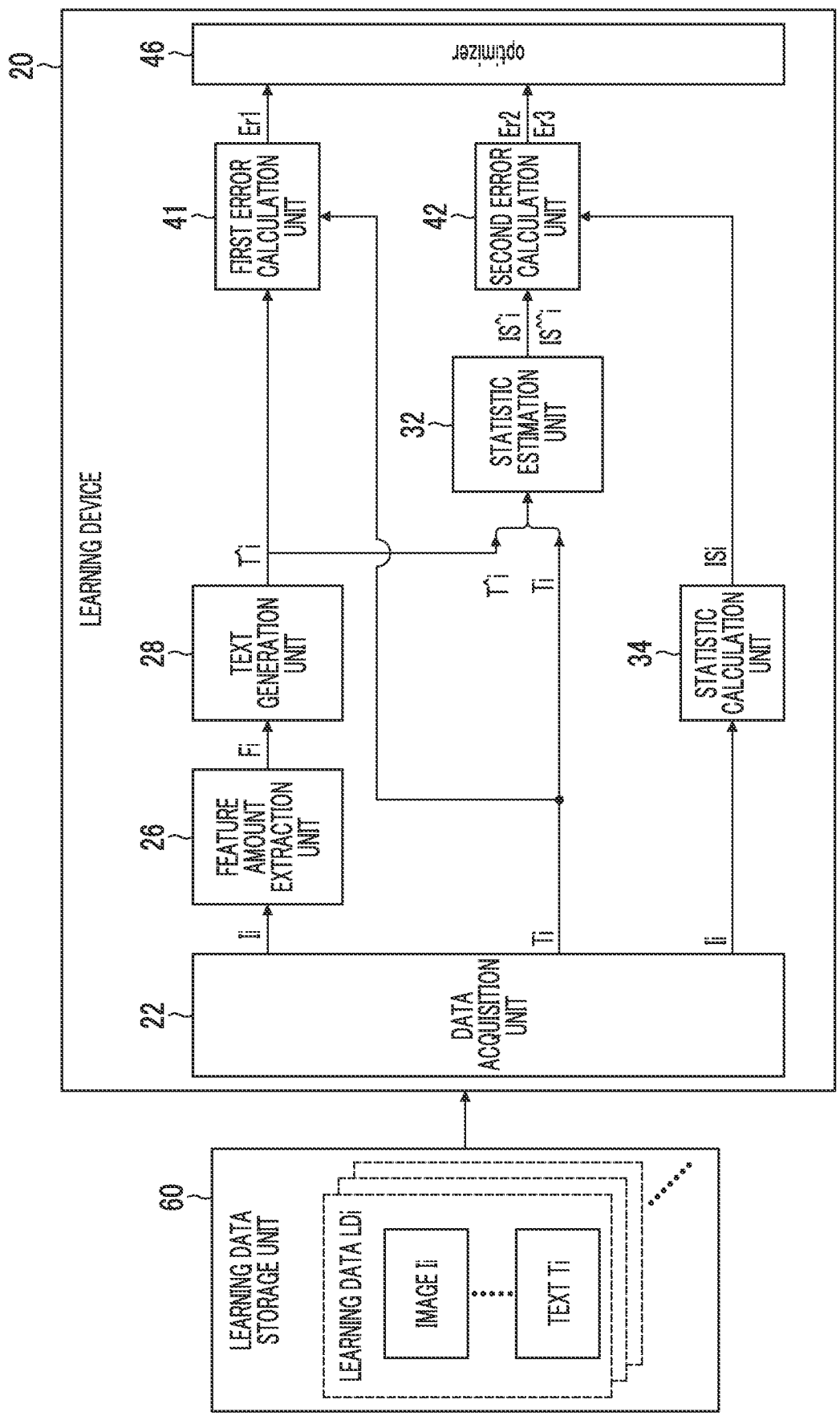
FIG. 2 is a functional block diagram showing a configuration example of a learning device according to the first embodiment.

FIG. 2 is a functional block diagram showing a configuration example of a learning device 20 according to the first embodiment. The learning device 20 is connected to a learning data storage unit 60. The learning data storage unit 60 is configured to include a storage that stores learning data LDi necessary for the learning device 20 to perform machine learning. The "learning data" is data for training used for machine learning, and is synonymous with "data for learning" or "training data".

In machine learning of the present embodiment, a large number of learning data LDi=(Ii, Ti), which is a combination of an image Ii and a text Ti describing the image Ii, are used. i is an index number for identifying the learning data, and, for example, in a case in which the total number of prepared learning data is N, i may be an integer of 0 or more and N−1 or less. For example, a group of n+1 sets of learning data from i=0 to i=n is expressed as follows.

{(I0,T0),(I1,T1), . . . (Ii,Ti), . . . (In,Tn)}

Note that in a case in which mini-batch processing is executed, assuming that the number of learning data in the mini-batch is m, m sets of learning data are selected from N sets.

The functions of the learning data storage unit 60 and the learning device 20 can be realized by a combination of the hardware and the software of the computer. Here, an example will be described in which the learning data storage unit 60 and the learning device 20 are respectively configured as separate devices, but these functions may be realized by one computer, or the processing functions thereof may be allocated and realized by two or more of a plurality of computers.

For example, the learning data storage unit 60 and the learning device 20 may be connected to each other via an electric telecommunication line (not shown). The term "connection" is not limited to wired connection, and includes a concept of wireless connection. The electric telecommunication line may be a local area network, or may be a wide area network.

With this configuration, the generation of the learning data and learning of a generative model can be performed without being physically and temporally restricted by each other.

The learning device 20 reads the learning data LDi from the learning data storage unit 60 and performs machine learning. The learning device 20 can perform reading of the learning data LDi and updating of parameters in a unit of the mini-batch in which a plurality of the learning data LDi are collected. In FIG. 2, a processing flow of one set of the learning data LDi=(Ii, Ti) is shown for the sake of simplicity, but in a case in which the mini-batch learning is performed, the learning data of a plurality of sets (for example, m sets) included in the mini-batch are collectively processed.

The learning device 20 includes a data acquisition unit 22, a feature amount extraction unit 26, a text generation unit 28, a statistic estimation unit 32, a statistic calculation unit 34, a first error calculation unit 41, a second error calculation unit 42, and an optimizer 46.

The data acquisition unit 22 is an interface which captures the learning data LDi. The data acquisition unit 22 may have the same configuration as the image acquisition unit 12 in FIG. 1. That is, the data acquisition unit 22 may be configured by a data input terminal that captures the learning data LDi from another signal processing unit outside or inside the device. In addition, the data acquisition unit 22 may employ a wired or wireless communication interface unit, a media interface unit that performs reading and writing of a portable external storage medium such as a memory card, or an appropriate combination of these aspects.

The feature amount extraction unit 26 calculates an image feature amount Fi from the input image Ii. The feature amount extraction unit 26 has the same configuration as the feature amount extraction unit 16 in FIG. 1. The image feature amount Fi calculated by the feature amount extraction unit 26 is expressed by a multidimensional vector. For example, the image feature amount Fi may be expressed by a 512-dimensional vector. The image feature amount Fi calculated by the feature amount extraction unit 26 is transmitted to the text generation unit 28.

The text generation unit 28 is configured by a model including the same hierarchical neural network as in the text generation unit 18 in FIG. 1. The text generation unit 28 generates an estimated text T^i based on the provided image feature amount Fi. The estimated text T^i output from the text generation unit 28 is transmitted to the first error calculation unit 41. In addition, the estimated text T^i output from the text generation unit 28 is transmitted to the statistic estimation unit 32.

The first error calculation unit 41 calculates an error between the estimated text T^i generated by the text generation unit 28 and the text Ti, which is supervised data. The first error calculation unit 41 evaluates the error by using a loss function. The error between the estimated text T^i and the text Ti as a correct text is called a first error Er1. The first error Er1 calculated by the first error calculation unit 41 is transmitted to the optimizer 46.

The statistic estimation unit 32 estimates an image statistic of the image corresponding to the text from the provided text to output the estimated image statistic. The image statistic is a statistic obtained by statistical calculation from the image data, for example, an average value of color components of red (R), green (G), blue (B), a color distribution, a color histogram, or the like. The image statistic is used as an index for evaluating an atmosphere of the entire image. In a case in which the text Ti input via the data acquisition unit 22 is provided, the statistic estimation unit 32 generates an estimated image statistic IS^i of the image corresponding to the text Ti from the text Ti. The estimated image statistic IS^i output from the statistic estimation unit 32 is transmitted to the second error calculation unit 42.

The statistic calculation unit 34 calculates an actual image statistic ISi of the image Ii from the image Ii input via the data acquisition unit 22. The image statistic ISi output from the statistic calculation unit 34 is transmitted to the second error calculation unit 42.

The second error calculation unit 42 calculates an error between the estimated image statistic IS^i generated by the statistic estimation unit 32 and the image statistic ISi corresponding to the supervised data. The second error calculation unit 42 evaluates the error by using the loss function. The error between the estimated image statistic IS^i and the correct image statistic ISi is called a second error Er2. The second error Er2 calculated by the second error calculation unit 42 is transmitted to the optimizer 46.

The optimizer 46 executes processing of updating a parameter of the network of each of the text generation unit 28 and the statistic estimation unit 32 from the calculation result of each of the first error calculation unit 41 and the second error calculation unit 42. The parameter of the network includes a filter coefficient (weight of connection between nodes) of filters used for processing each layer, node bias, and the like.

By using the calculation result of the error obtained from each of the first error calculation unit 41 and the second error calculation unit 42, the optimizer 46 executes parameter calculation processing of calculating an update amount of the parameter of the network of each of the text generation unit 28 and the statistic estimation unit 32, and parameter update processing of updating the parameter of the network of each of the text generation unit 28 and the statistic estimation unit 32 in response to the calculated update amount of the parameter. The optimizer 46 performs updating of the parameter based on the algorithm such as a back propagation method represented by a gradient descent method.

Further, in the learning device 20, the estimated text T^i generated by the text generation unit 28 is input into the statistic estimation unit 32, and the same learning as described above is performed. That is, the estimated text T^i generated by the text generation unit 28 is input into the statistic estimation unit 32.

The statistic estimation unit 32 generates an estimated image statistic IS^^ of the image corresponding to the estimated text T^i from the provided estimated text T^i. The estimated image statistic IS^^i output from the statistic estimation unit 32 is transmitted to the second error calculation unit 42.

The second error calculation unit 42 calculates an error between the estimated image statistic IS^^i generated by the statistic estimation unit 32 and the image statistic ISi as the supervised data. The error between the estimated image statistic IS^^i and the correct image statistic ISi is called a third error Er3. The third error Er3 calculated by the second error calculation unit 42 is transmitted to the optimizer 46.

The optimizer 46 uses the third error Er3 obtained from the second error calculation unit 42 to update the parameter of the network of each of the text generation unit 28 and the statistic estimation unit 32. Note that the optimizer 46 need only calculate at least an update amount of the parameter of the text generation unit 28 from the third error Er3 to update the parameter of the text generation unit 28, and an aspect can be adopted in which the parameter of the statistic estimation unit 32 is not updated based on the third error Er3.

The update timing of the parameters of the text generation unit 28 and the statistic estimation unit 32 is not particularly limited. The update timing of the parameter of the text generation unit 28 and the update timing of the parameter of the statistic estimation unit 32 may be different timing or simultaneous timing.

In addition, the update timing of the parameter of the text generation unit 28 based on the update amount of the parameter of the text generation unit 28 calculated from the first error and the update timing of the parameter of the text generation unit 28 based on the update amount of the parameter of the text generation unit 28 calculated from the third error may be different timing or simultaneous timing. For example, the optimizer 46 may merge the update amount of the parameter of the text generation unit 28 calculated from the first error and the update amount of the parameter of the text generation unit 28 calculated from the third error to execute the update processing of the parameter of the text generation unit 28 in response to the merged update amount of the parameter.

Figure 3:
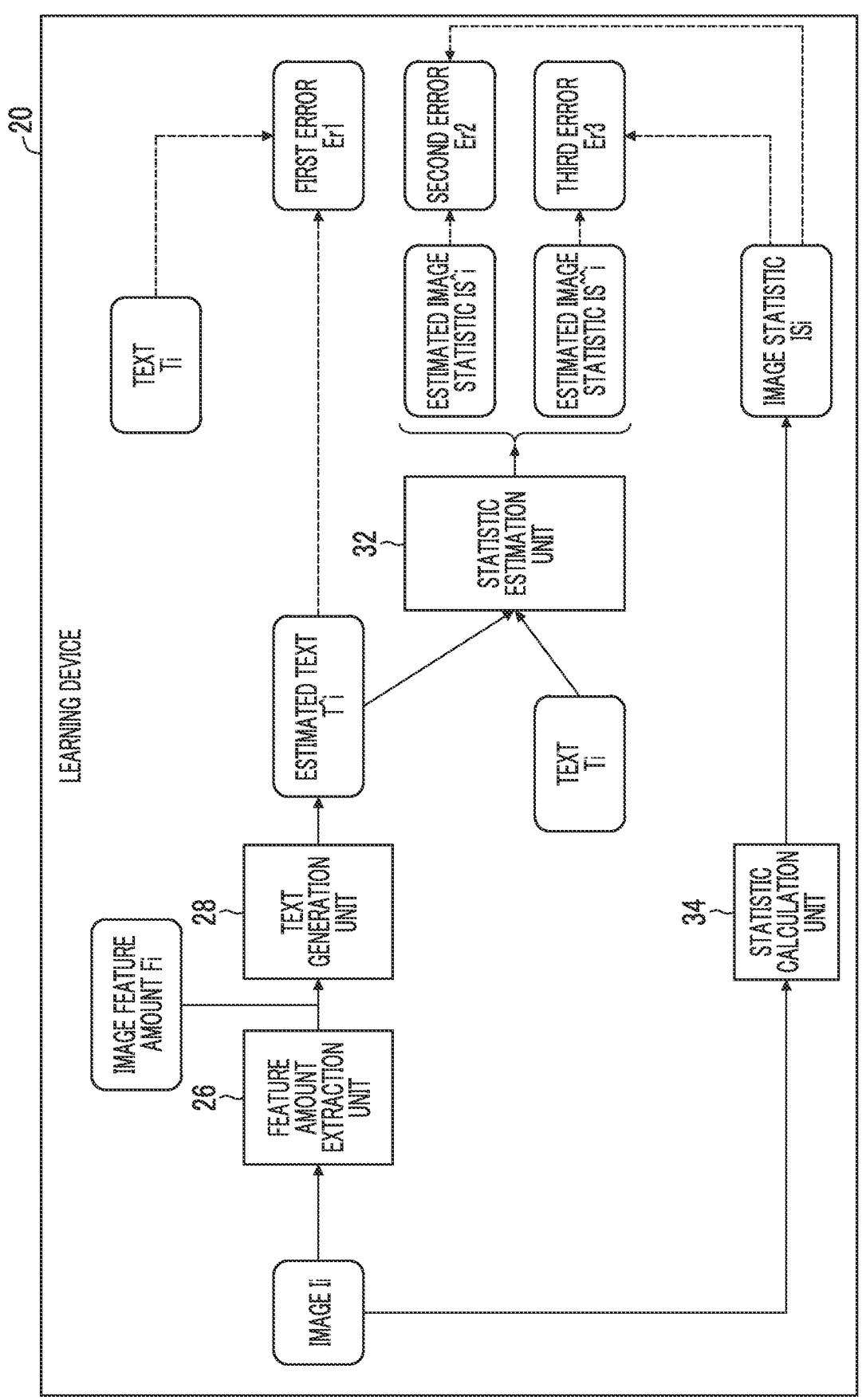
FIG. 3 is a block diagram schematically showing data input into each module of a feature amount extraction unit, a text generation unit, a statistic estimation unit, and a statistic calculation unit of the learning device and data output from each module.

FIG. 3 is a block diagram schematically showing data input into each module of the feature amount extraction unit 26, the text generation unit 28, the statistic estimation unit 32, and the statistic calculation unit 34 of the learning device 20 and data output from each module. The first error Er1 is calculated based on the estimated text T^i, which is output from the text generation unit 28, and the correct text Ti. The text Ti or the estimated text T^i is selectively input into the statistic estimation unit 32. The statistic estimation unit 32 receives an input of the text Ti and outputs the estimated image statistic IS^i. The second error Er2 is calculated based on the estimated image statistic IS^i, which is output from the statistic estimation unit 32, and the correct image statistic ISi.

In addition, the statistic estimation unit 32 receives an input of the estimated text T^i and outputs the estimated image statistic IS^^. The third error Er3 is calculated based on the estimated image statistic IS^^, which is output from the statistic estimation unit 32, and the correct image statistic ISi.

The data acquisition unit 22 is an example of a "learning data acquisition unit" in the present disclosure. The image Ii is an example of a "first image for learning" in the present disclosure. The text Ti is an example of a "first text" in the present disclosure. The combination of the feature amount extraction unit 26, the text generation unit 28, and the statistic estimation unit 32 is an example of a "learning model" in the present disclosure. The image feature amount Fi is an example of a "first image feature amount" in the present disclosure. The estimated text T^i is an example of a "first estimated text" in the present disclosure. The image statistic ISi is an example of a "first image statistic" in the present disclosure. The estimated image statistic IS^i is an example of a "first estimated image statistic" in the present disclosure. The estimated image statistic IS^^i estimated from the estimated text T^i is an example of a "second estimated image statistic" in the present disclosure. The optimizer 46 is an example of a "parameter update unit" in the present disclosure.

Example of Learning Method by Using Learning Device 20

Figure 4:
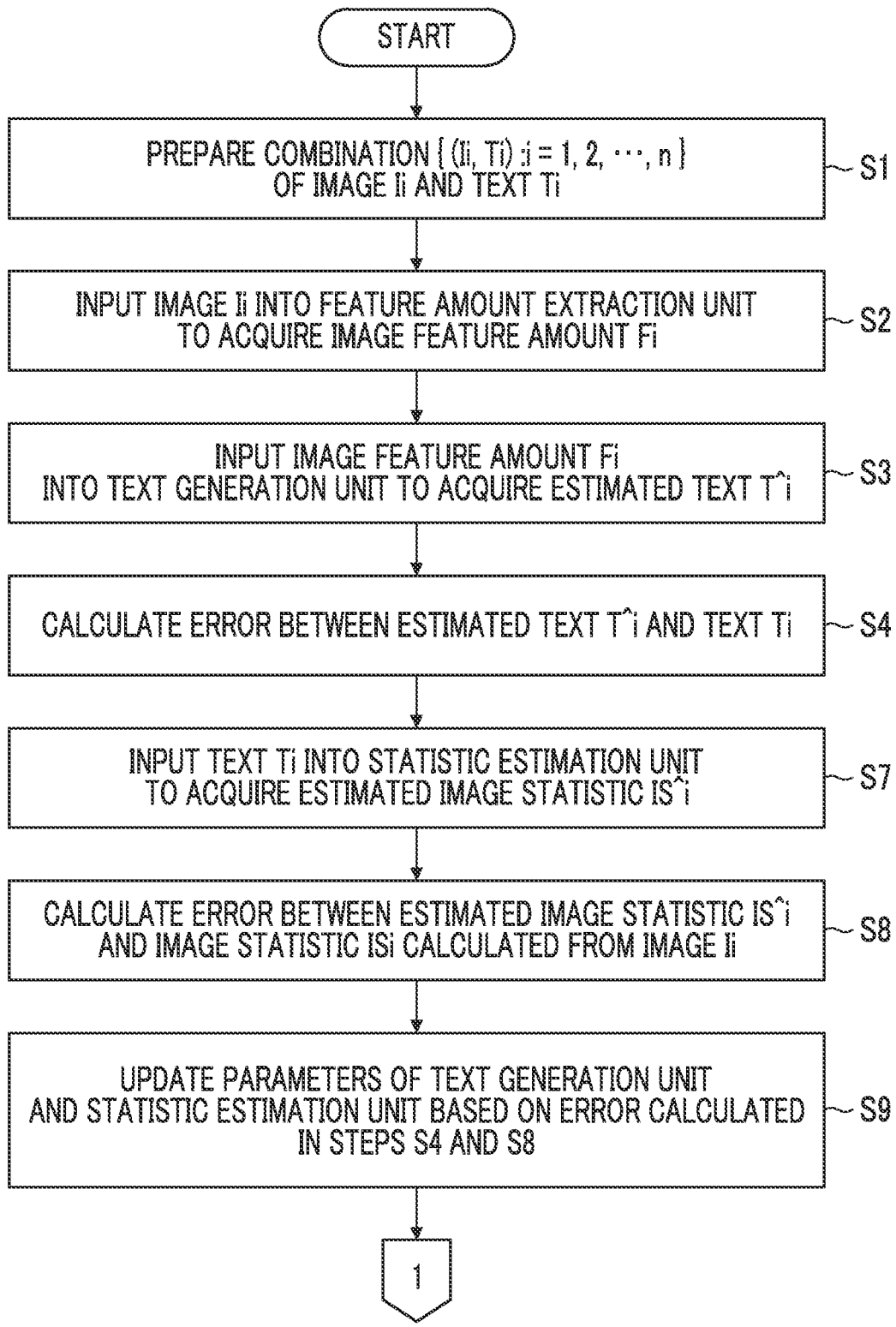
FIG. 4 is a flowchart showing an example of a procedure of a learning method according to the first embodiment.
Figure 5:
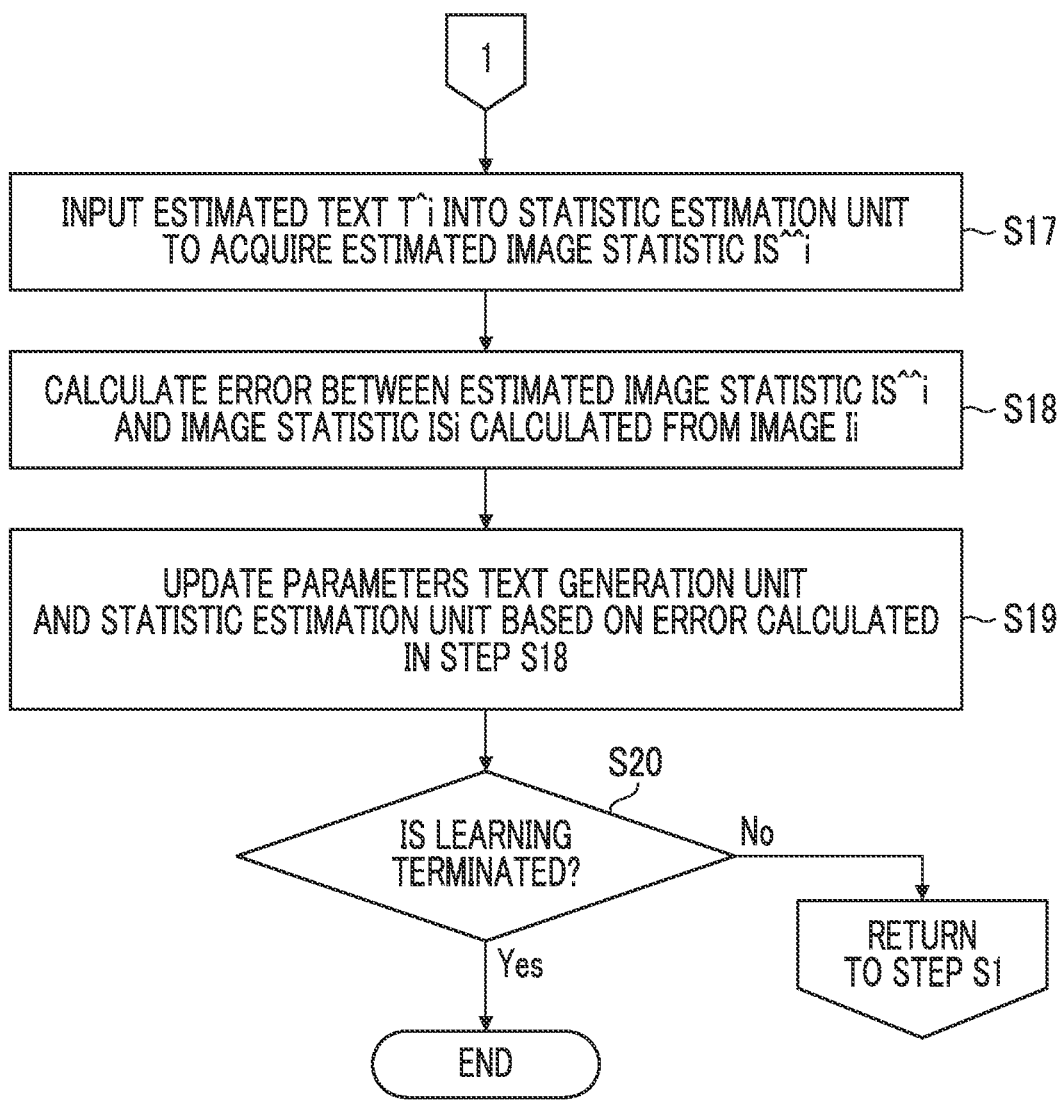
FIG. 5 is a flowchart showing an example of the procedure of the learning method according to the first embodiment.

FIGS. 4 and 5 are flowcharts showing examples of a procedure of a learning method according to the embodiment of the present invention. A part or all of the steps in the flowcharts shown in FIGS. 4 and 5 are performed by a processor functioning as the learning device 20.

First, in step S1, a set of the learning data is prepared. That is, a plurality of the combinations of the image Ii and the text Ti are prepared. A function of generating the set of the learning data may be incorporated in the learning device 20, or may be incorporated in a device other than the learning device 20.

Preparing the learning data in advance in a state in which the learning device 20 can read the learning data is included in step S1. In addition, generating the learning data as needed is included in step S1. The learning device 20 reads the learning data prepared in step S1. The learning device 20 can acquire the learning data in a unit of mini-batch including the plurality of learning data.

In step S2, the learning device 20 inputs the image Ii into the feature amount extraction unit 26 to acquire the image feature amount Fi.

In step S3, the learning device 20 inputs the image feature amount Fi into the text generation unit 28 to acquire the estimated text T^i.

In step S4, the first error calculation unit 41 calculates the error (first error Er1) between the estimated text T^i and the text Ti.

In step S7, the learning device 20 inputs the text Ti into the statistic estimation unit 32 to acquire the estimated image statistic IS^i.

In step S8, the second error calculation unit 42 calculates the error (second error Er2) between the estimated image statistic IS^i and the image statistic ISi which can be calculated from the image Ii. The statistic calculation unit 34 calculates the image statistic ISi from the image Ii at appropriate timing before step S8.

In step S9, the optimizer 46 updates the parameters of the text generation unit 28 and the statistic estimation unit 32 based on the errors calculated in steps S4 and S8. The update processing of the parameter is executed in a unit of mini-batch.

After step S9, the estimated text T^i estimated by the text generation unit 28 is used as an input of each of steps S7 to S9 described above, and the same processing is executed.

That is, in step S17 in FIG. 5, the learning device 20 inputs the estimated text T^i into the statistic estimation unit 32 to acquire the estimated image statistic IS^^.

In step S18, the second error calculation unit 42 calculates the error (third error Er3) between the estimated image statistic IS^^ and the image statistic ISi which can be calculated from the image Ii.

In step S19, the optimizer 46 updates the parameters of the text generation unit 28 and the statistic estimation unit 32 based on the error calculated in step S18. Note that the optimizer 46 need only update at least the parameter of the text generation unit 28 by using the third error Er3 calculated in step S18. For example, in step S19, the optimizer 46 may fix the parameter of the statistic estimation unit 32 to exclude the fixed parameter from an update target, and update the parameter only for the text generation unit 28. In addition, in step S19, the optimizer 46 may update the parameter of the text generation unit 28 based on the first error Er1 calculated in step S4 and the third error Er3 calculated in step S18.

The learning device 20 performs a determination as to whether or not to terminate the learning in step S20. A learning termination condition may be determined based on an error value or may be determined based on the number of updates of the parameter. As for a method based on the error value, for example, the learning termination condition may include that the error converges within a predetermined range. As for a method based on the number of updates, for example, the learning termination condition may include that the number of updates reaches the specified number of times.

In a case in which a determination result in step S20 is No determination, the learning device 20 returns to step S1 and repeats the learning processing until the learning termination condition is satisfied.

In a case in which the determination result in step S20 is Yes determination, the learning device 20 terminates the flowcharts shown in FIGS. 4 and 5.

A portion of the learned text generation unit 28 obtained as described above is applied as the text generation unit 18 of the caption generation device 10. The learned text generation unit 28 is an example of a "learned model" in the present disclosure. The module of the learned text generation unit 28 may be mounted as the text generation unit 18 of the caption generation device 10 which is a device different from the learning device 20, or the learning device 20 can be used as it is as the caption generation device 10. That is, the portions of the feature amount extraction unit 26 and the text generation unit 28 constituting the learning device 20 can be used as they are as the caption generation device 10.

Note that in the present embodiment, the feature amount extraction unit 26 is not a learning target, but the parameter of the feature amount extraction unit 26 may also be added to the learning target. In this case, the parameter of the network of each of the feature amount extraction unit 26 and the text generation unit 28 is updated by learning, and the feature amount extraction unit 26 and the text generation unit 28, which are learned, are used as the feature amount extraction unit 16 and the text generation unit 18 of the caption generation device 10.

The order of the steps shown in the flowcharts in FIGS. 4 and 5 can be appropriately changed within a range without technical contradiction, and a plurality of steps may be performed at the same time. In addition, the update timing and the update frequency of the parameter of each of the text generation unit 28 and the statistic estimation unit 32 are not limited to the examples in FIGS. 4 and 5.

Example of Parameter Update Processing of Learning Model

Figure 6:
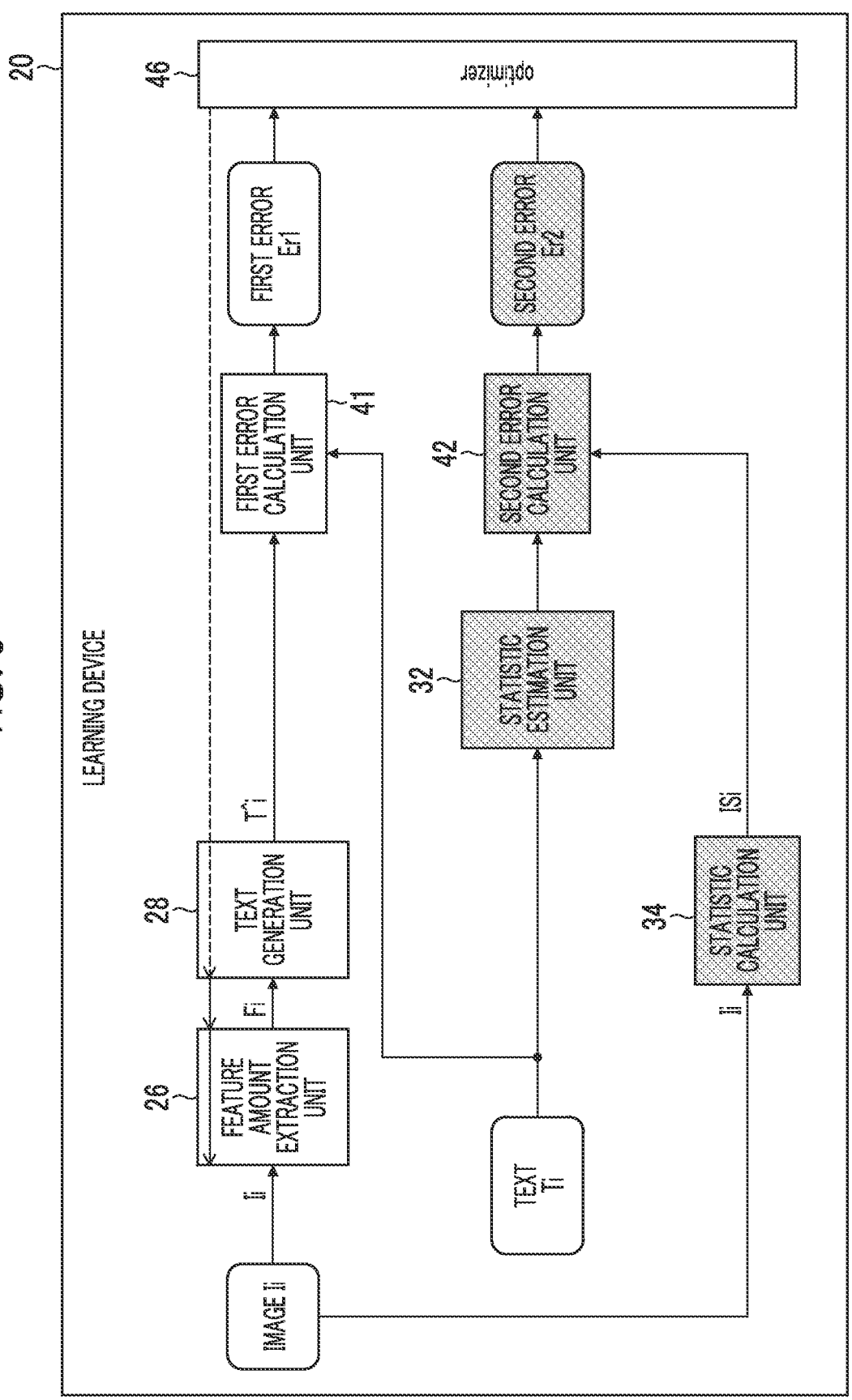
FIG. 6 is a block diagram schematically showing an aspect of processing of updating a parameter of the text generation unit based on a first error calculated by a first error calculation unit of the learning device.

FIG. 6 is a block diagram schematically showing an aspect of the processing of updating the parameter of the text generation unit 28 based on the first error Er1 calculated by the first error calculation unit 41. FIG. 6 shows an element, which is active in a case in which the parameter of the text generation unit 28 is updated by operations of steps S2 to S4 and step S9 in FIG. 4, and a data flow.

Figure 7:
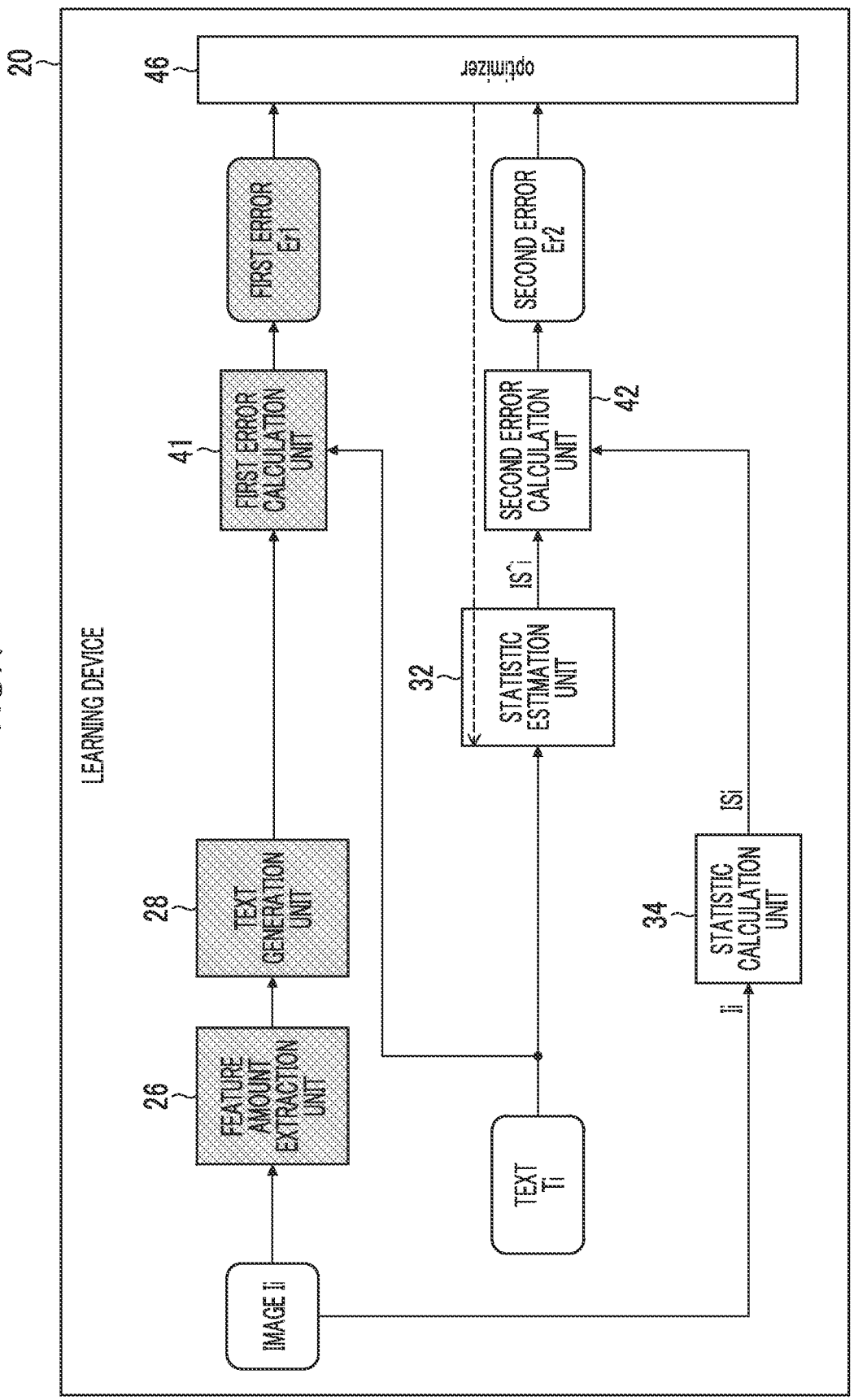
FIG. 7 is a block diagram schematically showing an aspect of processing of updating a parameter of the statistic estimation unit based on a second error calculated by a second error calculation unit of the learning device.

FIG. 7 is a block diagram schematically showing an aspect of the processing of updating the parameter of the statistic estimation unit 32 based on the second error Er2 calculated by the second error calculation unit 42. FIG. 7 shows an element, which is active in a case in which the parameter of the statistic estimation unit 32 is updated by operations of steps S7 to S9 in FIG. 4, and a data flow.

Figure 8:
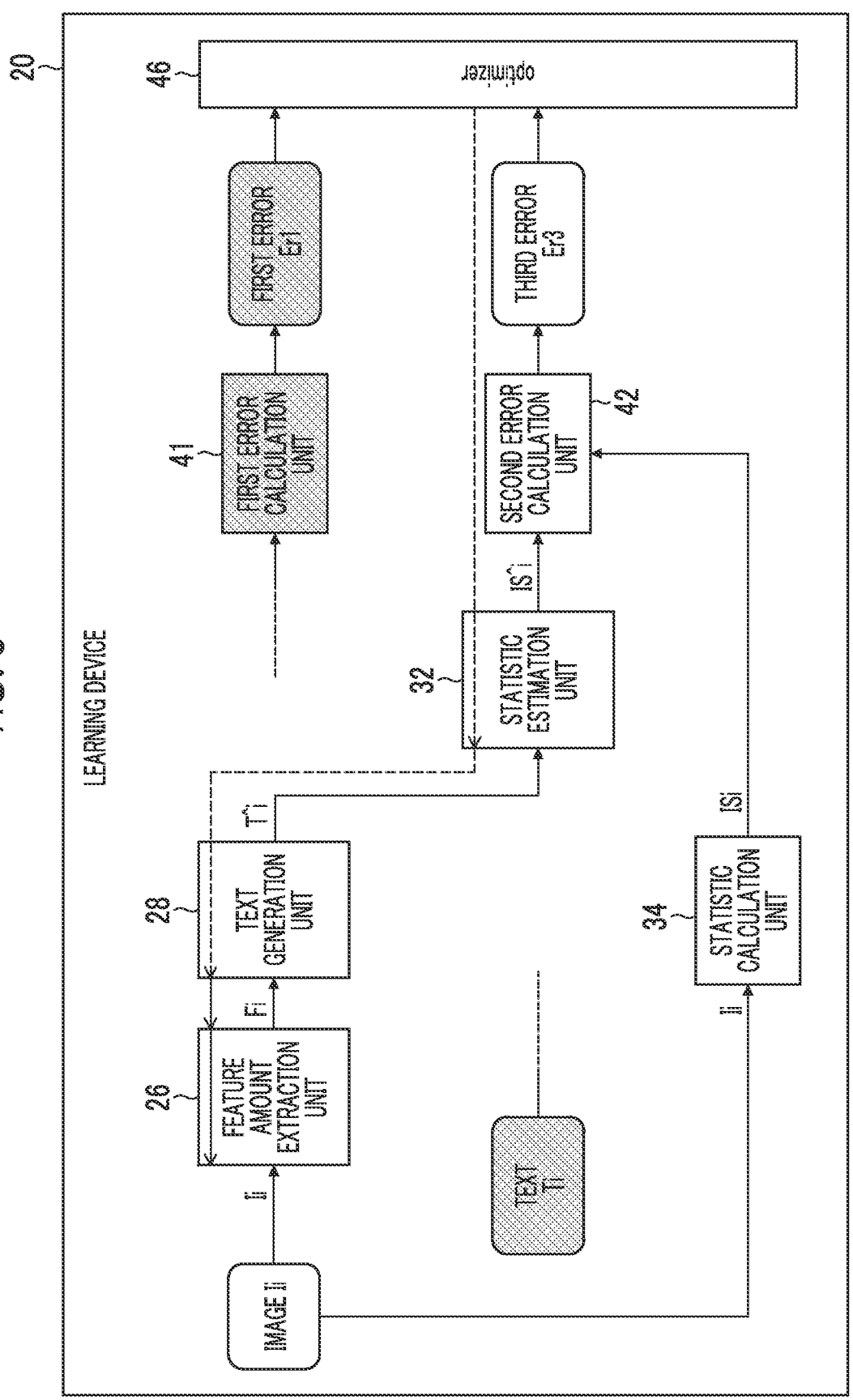
FIG. 8 is a block diagram schematically showing an aspect of processing of updating parameters of the text generation unit and the statistic estimation unit based on a third error calculated by the second error calculation unit of the learning device.

FIG. 8 is a block diagram schematically showing an aspect of the processing of updating parameters of the text generation unit 28 and the statistic estimation unit 32 based on the third error Er3 calculated by the second error calculation unit 42. FIG. 8 shows an element, which is active in a case in which the parameters of the text generation unit 28 and the statistic estimation unit 32 are updated by operations of steps S17 to S19 in FIG. 5, and a data flow.

The arrows shown by the broken lines in each in FIGS. 6 to 8 represent a data flow direction of the parameter update processing by the back propagation method. In addition, the blocks displayed by filling in gray in each in FIGS. 6 to 8 represents elements which are not directly involved in the parameter update processing of a back propagation path indicated by the broken line arrows, that is, elements which are not used (hereinafter referred to as an inactive element).

In a case in which the processing shown in FIG. 6 is executed, the statistic calculation unit 34, the statistic estimation unit 32, and the second error calculation unit 42 are inactive. The optimizer 46 updates the parameter of the text generation unit 28 based on the update amount of the parameter of the text generation unit 28 calculated based on the first error Er1. Note that the optimizer 46 may update the parameter of the feature amount extraction unit 26 in addition to the text generation unit 28. In this case, the optimizer 46 updates the parameters of the text generation unit 28 and the feature amount extraction unit 26 based on the update amount of the parameter of each of the text generation unit 28 and the feature amount extraction unit 26 calculated based on the first error Er1.

In a case in which the processing shown in FIG. 7 is executed, the optimizer 46 updates the parameter of the statistic estimation unit 32 based on the update amount of the parameter of the statistic estimation unit 32 calculated based on the second error Er2.

In a case in which the processing shown in FIG. 8 is executed, the optimizer 46 updates the parameter of each of the statistic estimation unit 32 and the text generation unit 28 based on the update amount of the parameter of each of the statistic estimation unit 32 and the text generation unit 28 calculated based on the third error Er3. Regarding the update of the parameter based on the third error Er3, the optimizer 46 may update the parameter of the feature amount extraction unit 26 as in FIG. 6. In this case, the optimizer 46 updates the parameter of each of the statistic estimation unit 32, the text generation unit 28, and the feature amount extraction unit 26 based on the update amounts of the parameters of the statistic estimation unit 32, the text generation unit 28, and the feature amount extraction unit 26 calculated based on the third error Er3.

Alternatively, an aspect can be adopted in which the optimizer 46 does not update the parameter of the statistic estimation unit 32 shown in FIG. 8.

Since the update of the parameter is performed based on the first error Er1 shown in FIG. 6 and the third error Er3 shown in FIG. 8, as compared with a case in which the update of the parameter is performed based only on the first error Er1, the text generation unit 28 can perform learning efficiently, and realize more accurate text generation.

The third error Er3 can be a value for evaluating the validity or the accuracy of the estimated text generated by the text generation unit 28. A task of estimating the text from the image has a large degree of freedom in the text, and it is difficult to converge learning by using only the first error Er1 in the learning method.

In this regard, in the learning method according to the first embodiment, a learning model in which the text generation unit 28 is combined with the statistic estimation unit 32 is employed, and the estimated text generated by the text generation unit 28 is used as an input of the statistic estimation unit 32, and the error between the estimated image statistic obtained from the statistic estimation unit 32 and the correct image statistic is evaluated to be used for learning of the text generation unit 28. According to the first embodiment, the text generation unit 28 acquires a function of outputting a more accurate estimated text as learning of each of the statistic estimation unit 32 and the text generation unit 28 progresses.

Note that instead of using the statistic estimation unit 32, it is also possible to employ an image generation model that receives an input of the text and outputs the image, but the task of generating the image from the text is a more complicated and difficult task than a task of generation the text from the image. Therefore, it is irrational to combine a learning model that focuses on creating a text generation model used for processing of generating the text from the image with a model that performs such complicated and difficult processing.

In this regard, in the first embodiment, a mechanism is employed to use the "image statistic" as simpler information instead of estimating the "image" from the text and to perform learning of the learning model including the text generation unit 28 by adding restriction such that the estimated image statistic is close to the correct image statistic.

Effect of First Embodiment

With the learning method according to the first embodiment, learning of the network of each of the text generation unit 28 and the statistic estimation unit 32 are performed in parallel, further, learning is performed by providing an input of the estimated text T^i output from the text generation unit 28 to the statistic estimation unit 32, so that a more accurate estimated text can be generated.

Description of Problem to be Solved by Second Embodiment

Hereinafter, a second embodiment of the present invention will be described. First, the problem to be solved will be briefly described. With the caption generation technology in the related art disclosed in Oriol Vinyals, Alexander Toshev, Samy Bengio, Dumitru Erhan "Show and Tell: A Neural Image Caption Generator", arXiv:1411.4555 and Yoshitaka Ushiku "Automatic generation of image caption" [search on Dec. 22, 2018], Internet <URL: https://www.slideshare.net/YoshitakaUshiku/ss-57148161>, a caption is generated in response to the learned data. Since a writing style of an automatically generated caption depends on data used for learning, it is necessary to prepare each model in order to output different writing styles. For example, a sentence created by a person has an expression and a sentence style peculiar to an individual creator, and the characteristics of these unique expressions appear as the writing style peculiar to the person.

In a case of trying to automatically generate such a caption, which is close to the writing style peculiar to each individual, in the technology in the related art, for example, it is considered that one individual model is prepared for each person and learning of an individual model is performed by using the learning data for each individual. However, it is difficult to collect a large amount of learning data for each individual, which cannot be said to be realistic.

Bo Dai, Sanja Fidler, Raquel Urtasun, Dahua Lin "Towards Diverse and Natural Image Descriptions via a Conditional GAN", arXiv:1703.06029 proposes a technology in which information different from the image is added to one model to output various writing styles, but there is no description of a specific method for reproducing the writing style peculiar to each individual.

In view of such circumstances, the second embodiment of the present invention is to provide a learning method and device of a model, which can change a writing style based on an attribute of a user to generate the text close to the intention of the user, a program, a learned model, and a text generation device.

Outline of Caption Generation Device According to Second Embodiment

Figure 9:
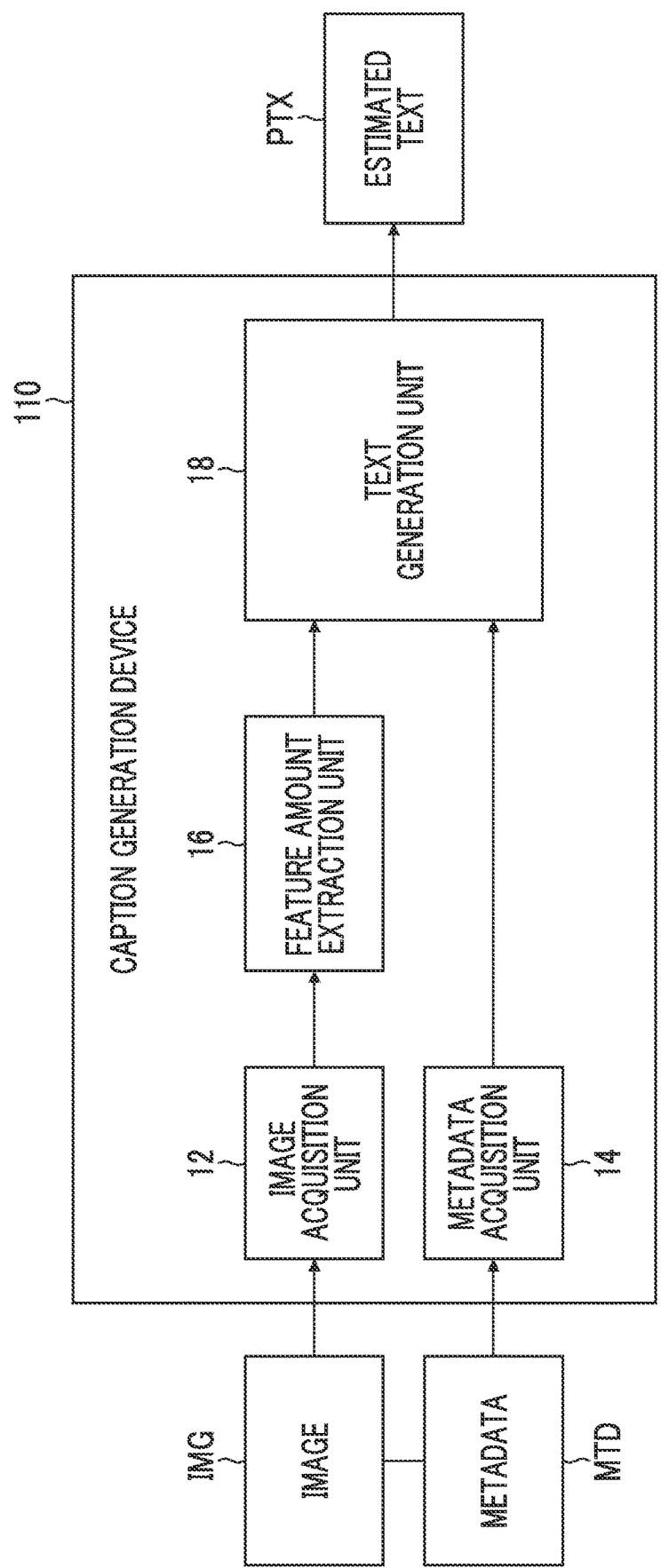
FIG. 9 is a functional block diagram showing an example of a caption generation device according to a second embodiment.

FIG. 9 is a functional block diagram showing an example of a caption generation device 110 according to the second embodiment. In FIG. 9, the elements, which are the same as or similar to those in FIG. 1, are designated by the same reference numerals. A difference from FIG. 1 will be described. The caption generation device 110 shown in FIG. 9 uses the image IMG and the metadata MTD including attribute information of the user as an input, generates the estimated text PTX close to the writing style of the user from these inputs, and outputs the generated estimated text PTX.

The "user" herein refers to a person who tries to add the caption to the image IMG. For example, the user may correspond to at least one of a photographer of the image IMG, a creator thereof, a contributor thereof, a provider thereof, or an owner thereof. For example, the attribute information of the user includes at least one of gender, age, occupation, hobby, preference, friendship, or the like of the user, preferably a combination of a plurality of pieces of information. A part or all of the metadata MTD can be acquired from registration information of the user and the like. For example, in a case of a user who uses a system of a social networking service (SNS), a part or all of the metadata MTD can be read from the registration information of an account. In addition, it is also possible to automatically acquire information such as the hobby and the preference of the user by analyzing the past posted contents on the SNS.

The estimated text PTX is a caption in response to a content of the image IMG, and is the character information expressed in a natural language, which is estimated to be close to the intention of the user specified by the metadata MTD. The "intention of the user" may be paraphrased as "taste of the user", the "hobby and preference of the user", or the "writing style of the user". That is, the estimated text PTX is linguistic expression information estimated to be close to the expression (writing style) created by the user specified by the metadata MTD.

The caption generation device 110 includes the image acquisition unit 12, the metadata acquisition unit 14, the feature amount extraction unit 16, and the text generation unit 18. The caption generation device 110 can be realized by a computer system including one or a plurality of computers. The function of the metadata acquisition unit 14 can be realized by a combination of the hardware and the software of the computer.

The metadata acquisition unit 14 is an interface which captures the data of the metadata MTD. The metadata acquisition unit 14 may be configured by the data input terminal that captures the metadata MTD from another signal processing unit outside or inside the device. A common interface which functions as the image acquisition unit 12 and the metadata acquisition unit 14 may be employed.

The metadata MTD input via the metadata acquisition unit 14 is transmitted to the text generation unit 18.

The text generation unit 18 generates the estimated text PTX based on the provided image feature amount and the metadata MTD associated with the image. The text generation unit 18 acquires a function of generating the text in the writing style close to the writing style peculiar to the user by machine learning using the learning method described below. The caption generation device 110 is an example of the "text generation device" in the present disclosure.

Configuration Example 2 of Learning Device

Hereinafter, a learning method of improving the estimation function of the text generation unit 18 will be described.

Figure 10:
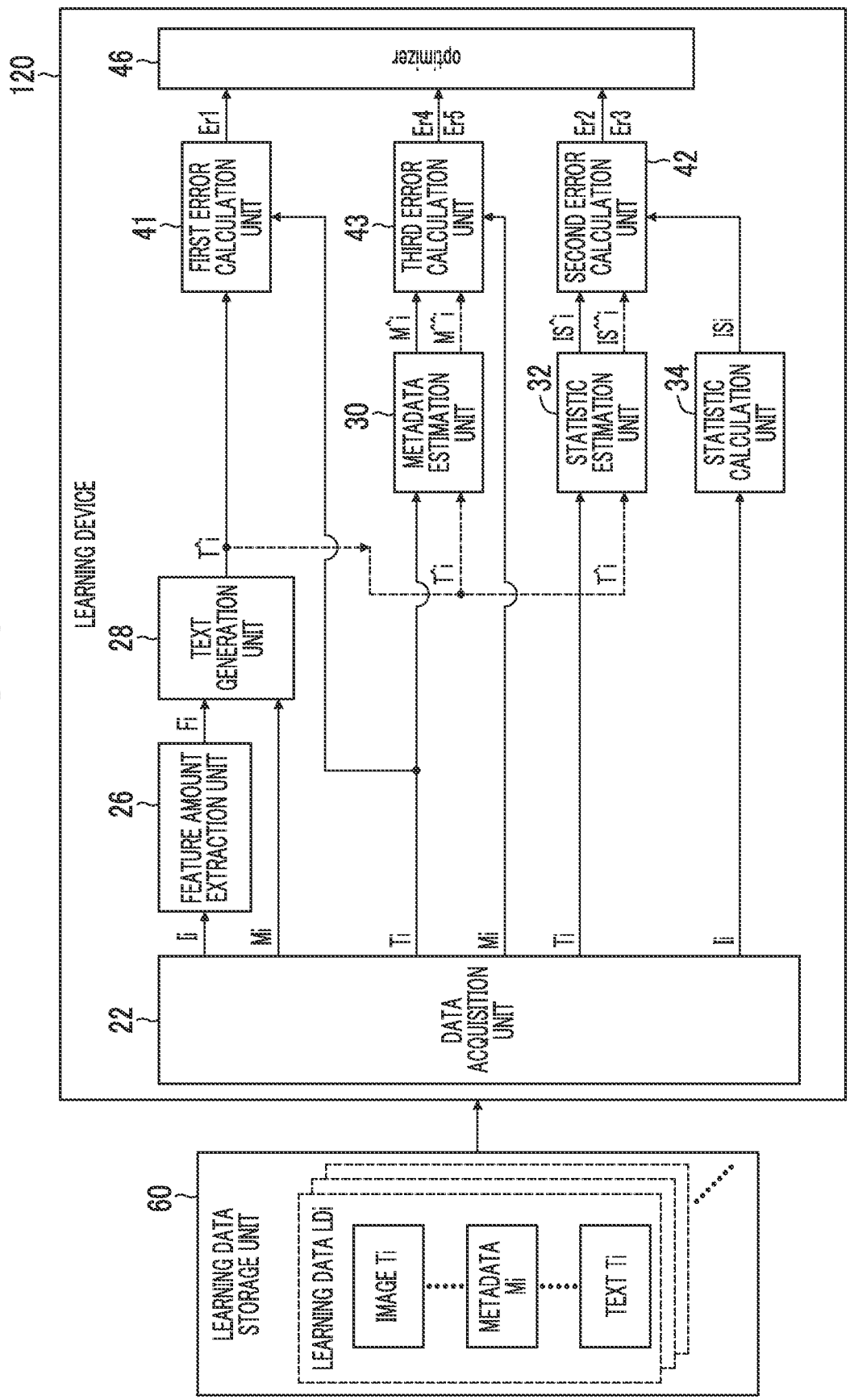
FIG. 10 is a functional block diagram showing a configuration example of a learning device according to the second embodiment.

FIG. 10 is a functional block diagram showing a configuration example of a learning device 120 according to the second embodiment. In FIG. 10, the elements, which are the same as or similar to those in FIG. 3, are designated by the same reference numerals. A difference from FIG. 3 will be described.

The learning device 120 is connected to the learning data storage unit 60. The learning data storage unit 60 is configured to include the storage that stores the learning data LDi necessary for the learning device 20 to perform machine learning. In machine learning of the second embodiment, a large number of learning data LDi=(Ii, Mi, Ti), which is a combination of the image Ii, metadata Mi indicating the attribute of the user, and the text Ti describing the image Ii, are used. For example, a group of n+1 sets of learning data from i=0 to i=n is expressed as follows.

$$\{(I0,M0,T0),(I1,M1,T1), \ldots (Ii,Mi,Ti), \ldots (In,Mn,Tn)\}$$

For example, such a set of the learning data can be generated by combining the image posted in the past by the user who uses the social networking service (SNS), user information of the user (contributor), a caption input by the user for the image, and the like.

The learning device 120 reads the learning data LDi from the learning data storage unit 60 to perform machine learning. In FIG. 10, a processing flow of one set of the learning data LDi=(Ii, Mi, Ti) is shown for the sake of simplicity, but in a case in which the mini-batch learning is performed, the learning data of a plurality of sets (for example, m sets) included in the mini-batch are included are collectively processed.

The learning device 120 includes the data acquisition unit 22, the feature amount extraction unit 26, the text generation unit 28, a metadata estimation unit 30, the statistic estimation unit 32, the statistic calculation unit 34, the first error calculation unit 41, the second error calculation unit 42, a third error calculation unit 43, and the optimizer 46.

The data acquisition unit 22 may have the same configuration as the image acquisition unit 12 and the metadata acquisition unit 14 in FIG. 9.

The text generation unit 28 is configured by a learning model including the same hierarchical neural network as in the text generation unit 18 in FIG. 9. The text generation unit 28 generates an estimated text T^i based on the provided image feature amount Fi and the metadata Mi. The estimated text T^i output from the text generation unit 28 is transmitted to the first error calculation unit 41. In addition, the estimated text T^i output from the text generation unit 28 is transmitted to the metadata estimation unit 30 and the statistic estimation unit 32.

The metadata estimation unit 30 estimates the metadata of the user corresponding to the text from the provided text to output the estimated metadata. That is, in a case in which the text Ti input via the data acquisition unit 22 is provided, the metadata estimation unit 30 generates estimated metadata M^i from the text Ti. The estimated metadata M^i output from the metadata estimation unit 30 is transmitted to the third error calculation unit 43.

The third error calculation unit 43 calculates an error between the estimated metadata M^i generated by the metadata estimation unit 30 and the metadata Mi, which is the supervised data. The third error calculation unit 43 evaluates the error by using the loss function. The error between the estimated metadata M^i and the correct metadata Mi is called a fourth error Er4. The fourth error Er4 calculated by the third error calculation unit 43 is transmitted to the optimizer 46.

The optimizer 46 executes processing of updating a parameter of the network of each of the text generation unit 28, the metadata estimation unit 30, and the statistic estimation unit 32 from the calculation result of each of the first error calculation unit 41, the second error calculation unit 42, and the third error calculation unit 43.

By using the calculation result of the error obtained from each of the first error calculation unit 41, the second error calculation unit 42, and the third error calculation unit 43, the optimizer 46 executes parameter calculation processing of calculating an update amount of the parameter of the network of each of the text generation unit 28, the metadata estimation unit 30, and the statistic estimation unit 32, and parameter update processing of updating the parameter of the network of each of the text generation unit 28, the metadata estimation unit 30, and the statistic estimation unit 32 in response to the calculated update amount of the parameter.

Further, in the learning device 120, the estimated text T^i generated by the text generation unit 28 is input into each of the metadata estimation unit 30 and the statistic estimation unit 32, and the same learning as described above is performed. That is, the estimated text T^i generated by the text generation unit 28 is input into the metadata estimation unit 30 and the statistic estimation unit 32.

The metadata estimation unit 30 generates an estimated metadata M^^i of the user corresponding to the estimated text T^i from the provided estimated text T^i. The estimated metadata M^^i output from the metadata estimation unit 30 is transmitted to the third error calculation unit 43.

The third error calculation unit 43 calculates an error between the estimated metadata M^^i generated by the metadata estimation unit 30 and the metadata Mi, which is the supervised data. The error between the estimated metadata M^^i and the correct metadata Mi is called a fifth error Er5. The fifth error Er5 calculated by the third error calculation unit 43 is transmitted to the optimizer 46.

The optimizer 46 uses the fourth error Er4 obtained from the third error calculation unit 43 to update the parameter of the network of the metadata estimation unit 30. In addition, the optimizer 46 uses the fifth error Er5 obtained from the third error calculation unit 43 to update the parameter of the network of each of the metadata estimation unit 30 and the text generation unit 28.

Note that the optimizer 46 need only calculate at least an update amount of the parameter of the text generation unit 28 from the fifth error Er5 to update the parameter of the text generation unit 28, and an aspect can be adopted in which the parameter of the metadata estimation unit 30 is not updated based on the fifth error Er5.

The update timing of the parameters of the text generation unit 28, the metadata estimation unit 30, and the statistic estimation unit 32 is not particularly limited. The update timing of the parameter of the text generation unit 28, the update timing of the parameter of the metadata estimation unit 30, and the update timing of the parameter of the statistic estimation unit 32 may be different timing or simultaneous timing. In addition, the update timing of the parameter of the text generation unit 28 based on the update amount of the parameter of the text generation unit 28 calculated from the first error Er1, the update timing of the parameter of the text generation unit 28 based on the update amount of the parameter of the text generation unit 28 calculated from the third error Er3, and the update timing of the parameter of the text generation unit 28 based on the update amount of the parameter of the text generation unit 28 calculated from the fifth error Er5 may be different timing from each other or a part or all of the update timing may be simultaneous timing. For example, the optimizer 46 may merge the update amount of the parameter of the text generation unit 28 calculated from the first error, the update amount of the parameter of the text generation unit 28 calculated from the third error, and the update amount of the parameter of the text generation unit 28 calculated from the fifth error to execute the update processing of the parameter of the text generation unit 28 in response to the merged update amount of the parameter.

Figure 11:
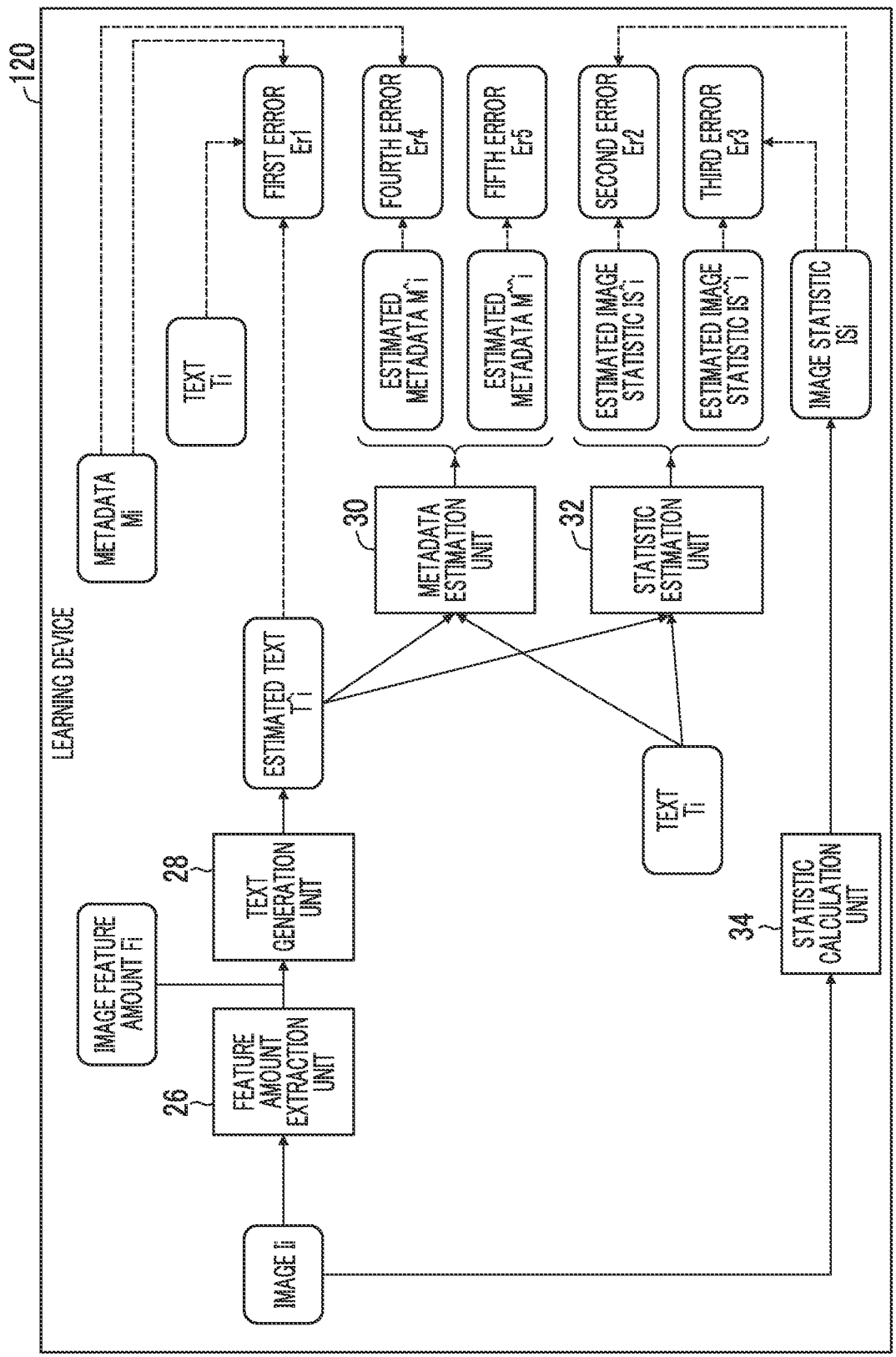
FIG. 11 is a block diagram schematically showing data input into each module of a feature amount extraction unit, a text generation unit, a metadata estimation unit, a statistic estimation unit, and a statistic calculation unit of the learning device and data output from each module.

FIG. 11 is a block diagram schematically showing data input into each module of the feature amount extraction unit 26, the text generation unit 28, the metadata estimation unit 30, the statistic estimation unit 32, and the statistic calculation unit 34 of the learning device 120 and data output from each module. In FIG. 11, the elements, which are the same as those shown in FIG. 3, are designated by the same reference numerals, and the description thereof will be omitted. A difference of FIG. 11 from FIG. 3 will be described.

The text Ti or the estimated text T^i is selectively input into the metadata estimation unit 30 of the learning device 120 shown in FIG. 11. The metadata estimation unit 30 receives an input of the text Ti to output the estimated metadata M^i. The fourth error Er4 is calculated based on the estimated metadata M^i, which is output from the metadata estimation unit 30, and the correct metadata Mi.

In addition, the metadata estimation unit 30 receives an input of the estimated text T^i to output the estimated metadata M^^i. The fifth error Er5 is calculated based on the estimated metadata M^^i, which is output from the metadata estimation unit 30, and the correct metadata Mi.

The metadata Mi is an example of "first metadata" in the present disclosure. The user corresponding to the metadata Mi is an example of a "first user" in the present disclosure. The combination of the feature amount extraction unit 26, the text generation unit 28, the metadata estimation unit 30, and the statistic estimation unit 32 is an example of the "learning model" in the present disclosure. The estimated metadata M^i is an example of "first estimated metadata" in the present disclosure. The estimated metadata M^^i estimated from the estimated text T^i is an example of "second estimated metadata" in the present disclosure.

Example of Learning Method by Using Learning Device 120

Figure 12:
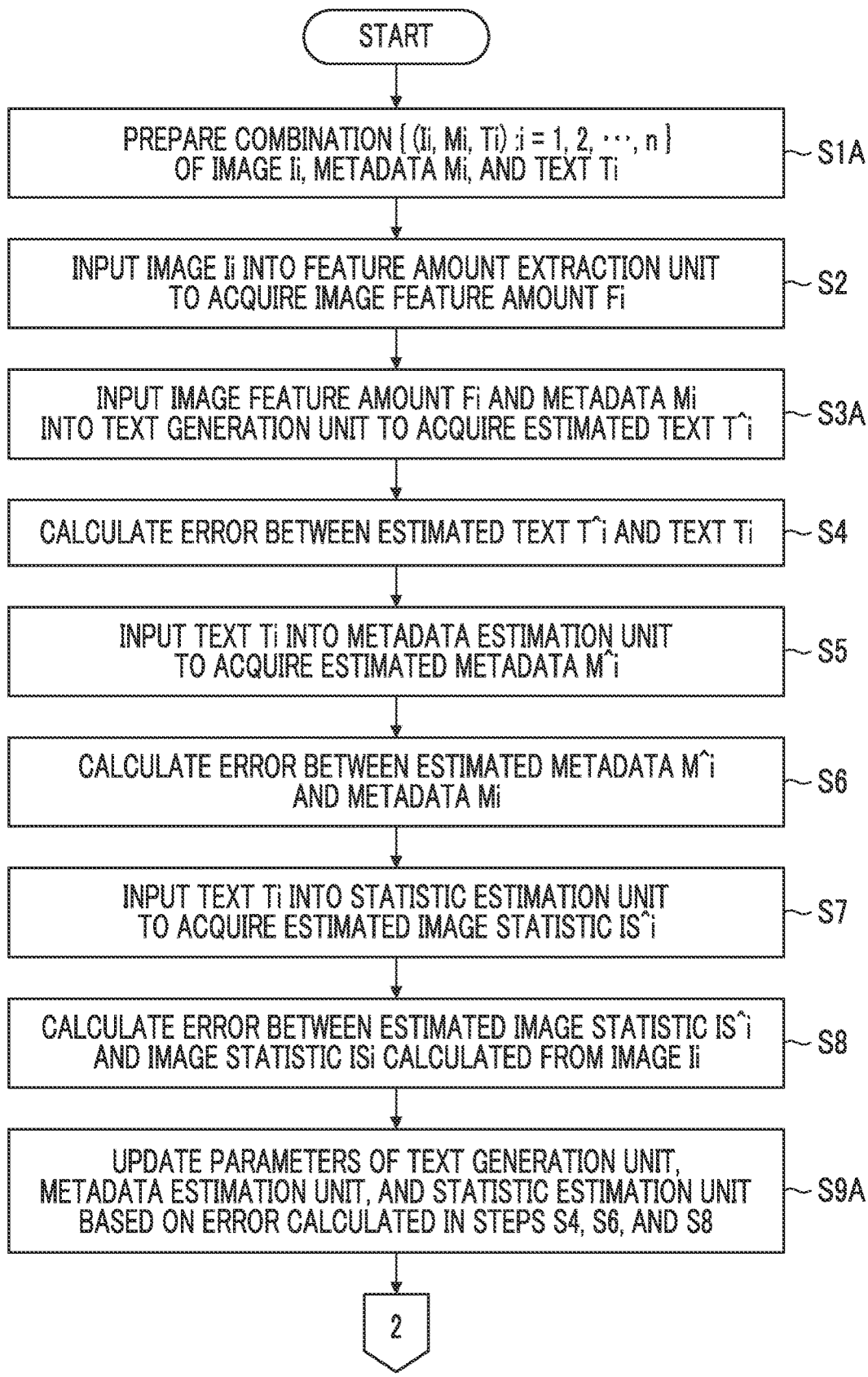
FIG. 12 is a flowchart showing an example of a procedure of a learning method according to the second embodiment.
Figure 13:
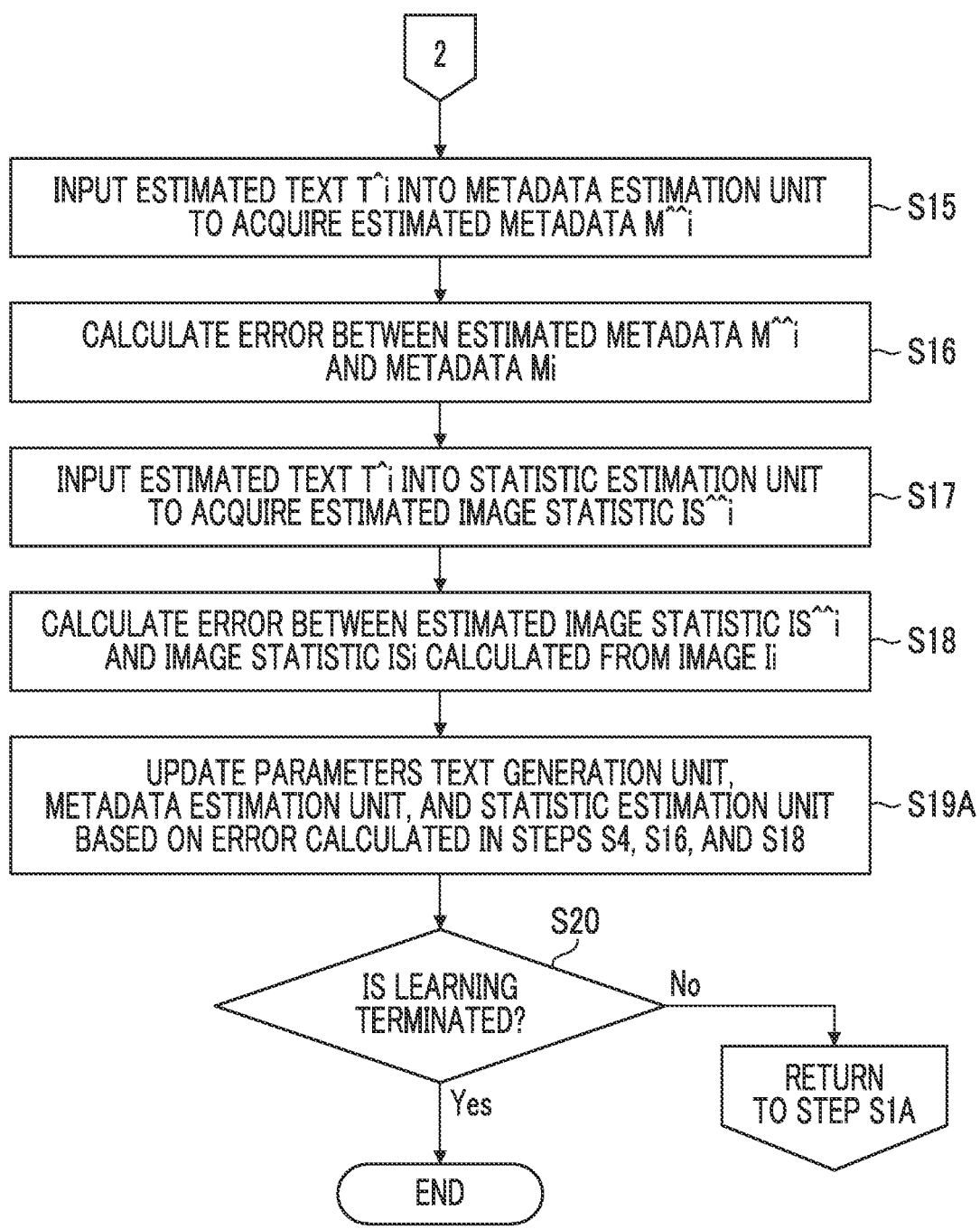
FIG. 13 is a flowchart showing an example of the procedure of the learning method according to the second embodiment.

FIGS. 12 and 13 are flowcharts showing examples of the procedure of the learning method according to the second embodiment. In FIGS. 12 and 13, steps, which are the same as or similar to those in the flowcharts shown in FIGS. 3 and 4, are designated by the same step numbers. Differences of FIGS. 12 and 13 from FIGS. 3 and 4 will be described.

The flowchart in FIG. 12 includes steps S1A, S3A, and S9A instead of step S1, step S3, and step S9 in FIG. 3. In addition, the flowchart in FIG. 12 includes steps S5 and S6 between steps S4 and S7 in FIG. 3. The flowchart in FIG. 13 includes steps S15 and S16 before step S17 shown in FIG. 4. In addition, the flowchart in FIG. 13 includes step S19A instead of step S19 in FIG. 4.

In step S1A in FIG. 12, a plurality of the combinations of the image Ii, the metadata Mi, and the text Ti are prepared.

In step S3A, the learning device 20 inputs the image feature amount Fi and the metadata Mi into the text generation unit 28 to acquire the estimated text T^i.

In step S5, the learning device 20 inputs the text Ti into the metadata estimation unit 30 to acquire the estimated metadata M^i.

In step S6, the third error calculation unit 43 calculates the error (fourth error) between the estimated metadata M^i and the metadata Mi.

In step S9A, the optimizer 46 updates the parameters of the text generation unit 28, the metadata estimation unit 30, and the statistic estimation unit 32 based on the error calculated in steps S4, S6, and S8.

After step S9A, the estimated text T^i estimated by the text generation unit 28 is used as an input of each of steps S5 to S9A described above, and the same processing is executed.

That is, in step S15 in FIG. 13, the learning device 120 inputs the estimated text T^iN into the metadata estimation unit 30 to acquire the estimated metadata M^^i.

In step S16, the third error calculation unit 43 calculates the error (fifth error Er5) between the estimated metadata M^^i and the metadata Mi.

In step S19A, the optimizer 46 updates the parameters of the text generation unit 28, the metadata estimation unit 30, and the statistic estimation unit 32 based on the error calculated in steps S4, S16, and S18. Note that the optimizer 46 need only update at least the parameter of the text generation unit 28 by using the fifth error calculated in step S16 and the third error Er3 calculated in step S18. For example, in step S19A, the optimizer 46 may fix the parameter of any one or both of the metadata estimation unit 30 and the statistic estimation unit 32 to exclude the fixed parameter from the update target, and update the parameter of the text generation unit 28. In addition, in step S19A, the optimizer 46 may update the parameter of the text generation unit 28 based on the fifth error Er5 and the third error Er3 without using the first error Er1 calculated in step S4. Other processing is the same as those in the flowchart shown in FIGS. 3 and 4.

A portion of the learned text generation unit 28 obtained as described above is applied as the text generation unit 18 of the caption generation device 110. Note that the feature amount extraction unit 26 may be included in the learning target as in the first embodiment.

The order of the steps shown in the flowcharts in FIGS. 12 and 13 can be appropriately changed within a range without technical contradiction, and a plurality of steps may be performed at the same time. In addition, the update timing and the update frequency of the parameter of each of the text generation unit 28, the metadata estimation unit 30, and the statistic estimation unit 32 are not limited to the examples in FIGS. 12 and 13.

Example of Update Processing of Parameter in Learning Model

Figure 14:
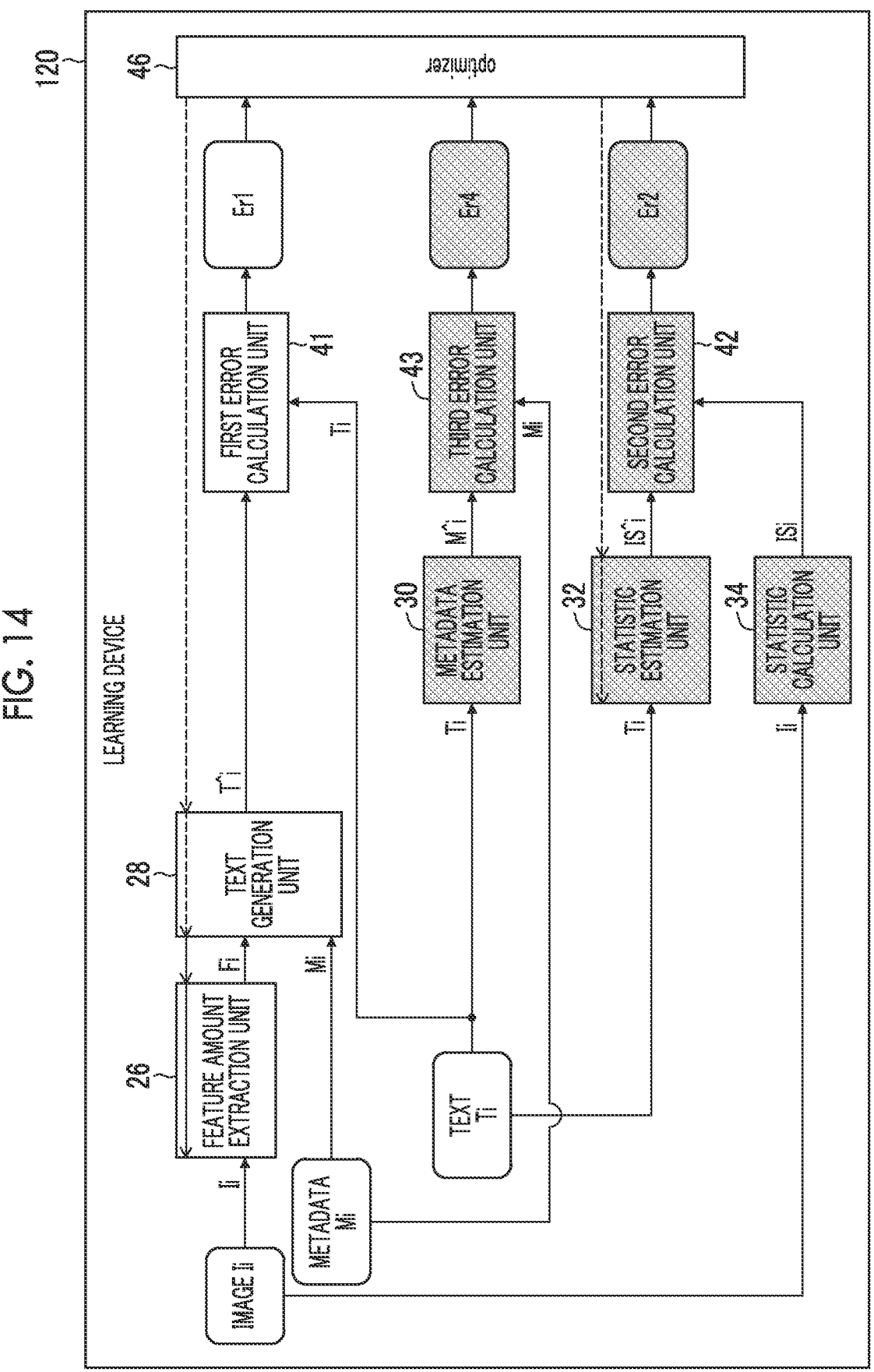
FIG. 14 is a block diagram schematically showing an aspect of processing of updating a parameter of the text generation unit based on a first error calculated by a first error calculation unit of the learning device.

FIG. 14 is a block diagram schematically showing an aspect of the processing of updating the parameter of the text generation unit 28 based on the first error calculated by the first error calculation unit 41. FIG. 14 shows an element, which is active in a case in which the parameter of the text generation unit 28 is updated by operations of steps S2 to S4 and step S9A in FIG. 12, and a data flow. Note that the parameter of the feature amount extraction unit 26 may or may not be included in a target of the update processing by learning.

Figure 15:
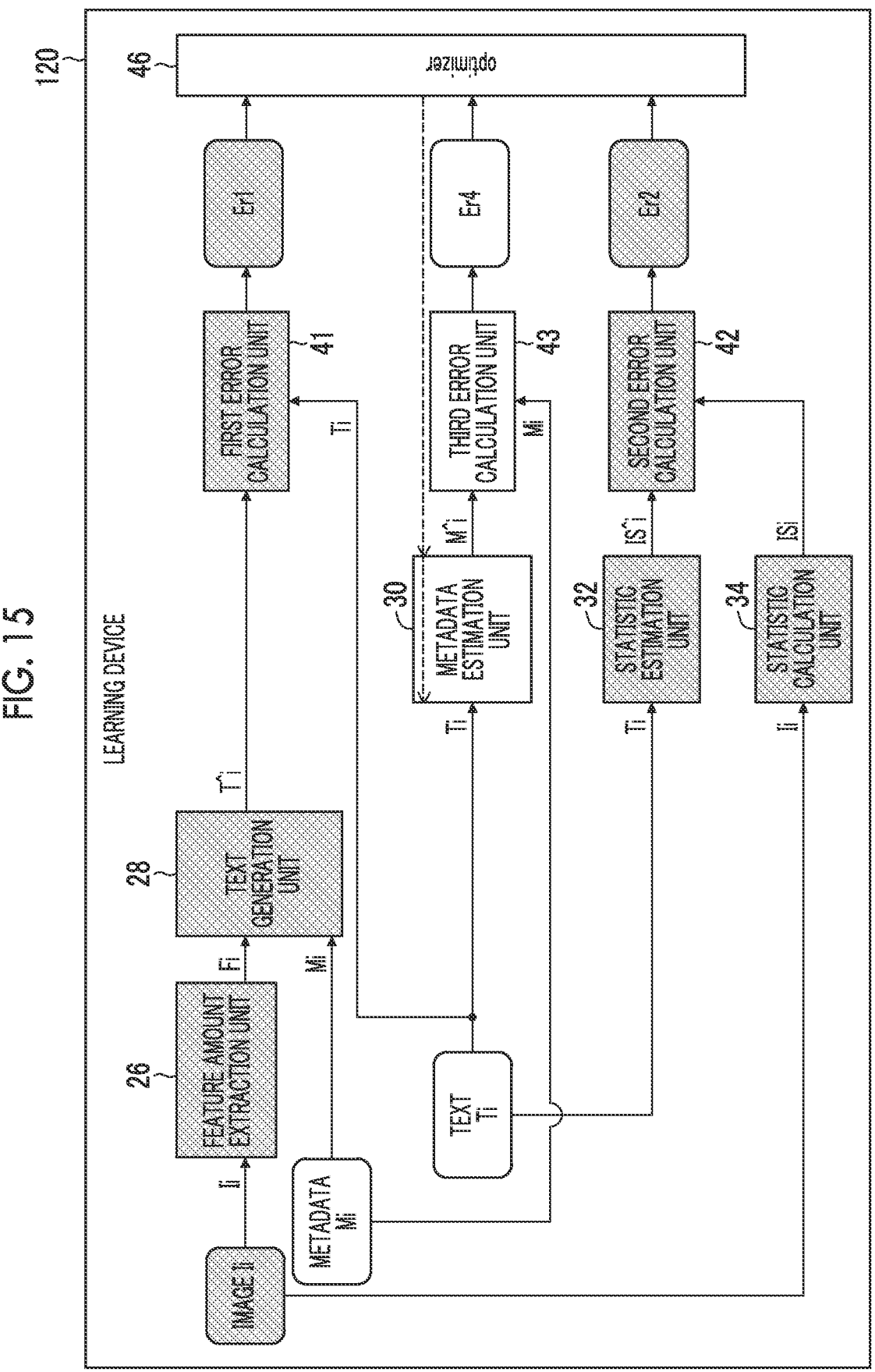
FIG. 15 is a block diagram schematically showing an aspect of processing of updating a parameter of the metadata estimation unit based on a fourth error calculated by a third error calculation unit of the learning device.

FIG. 15 is a block diagram schematically showing an aspect of the processing of updating the parameter of the metadata estimation unit 30 based on the fourth error calculated by the third error calculation unit 43. FIG. 15 shows an element, which is active in a case in which the parameter of the metadata estimation unit 30 is updated by operations of steps S5, S6, and S9A in FIG. 12, and a data flow.

Figure 16:
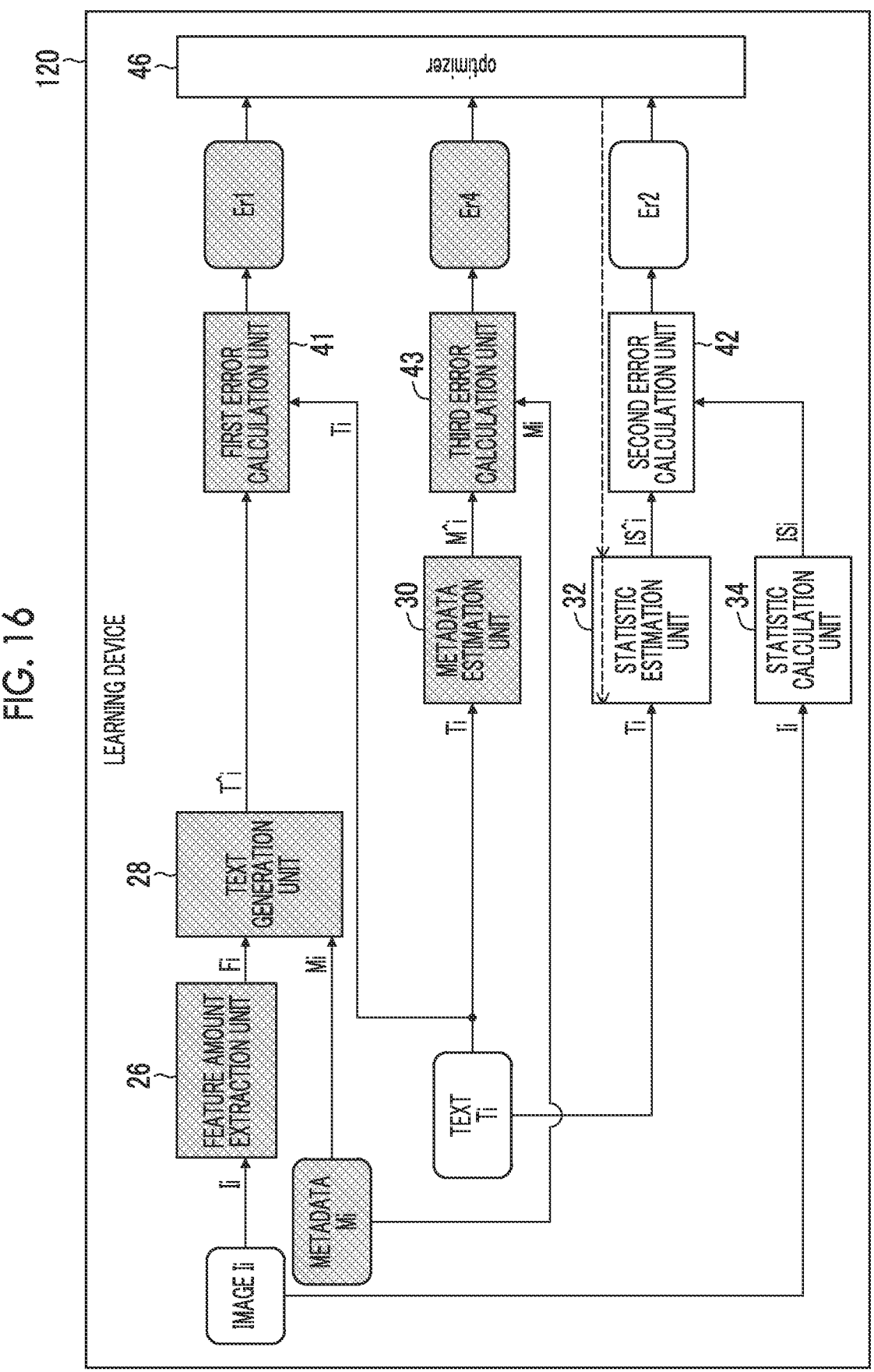
FIG. 16 is a block diagram schematically showing an aspect of processing of updating a parameter of the statistic estimation unit based on a second error calculated by a second error calculation unit of the learning device.

FIG. 16 is a block diagram schematically showing an aspect of the processing of updating the parameter of the statistic estimation unit 32 based on the second error calculated by the second error calculation unit 42. FIG. 16 shows an element, which is active in a case in which the parameter of the metadata estimation unit 30 is updated by operations of steps S7, S8, and S9A in FIG. 12, and a data flow.

Figure 17:
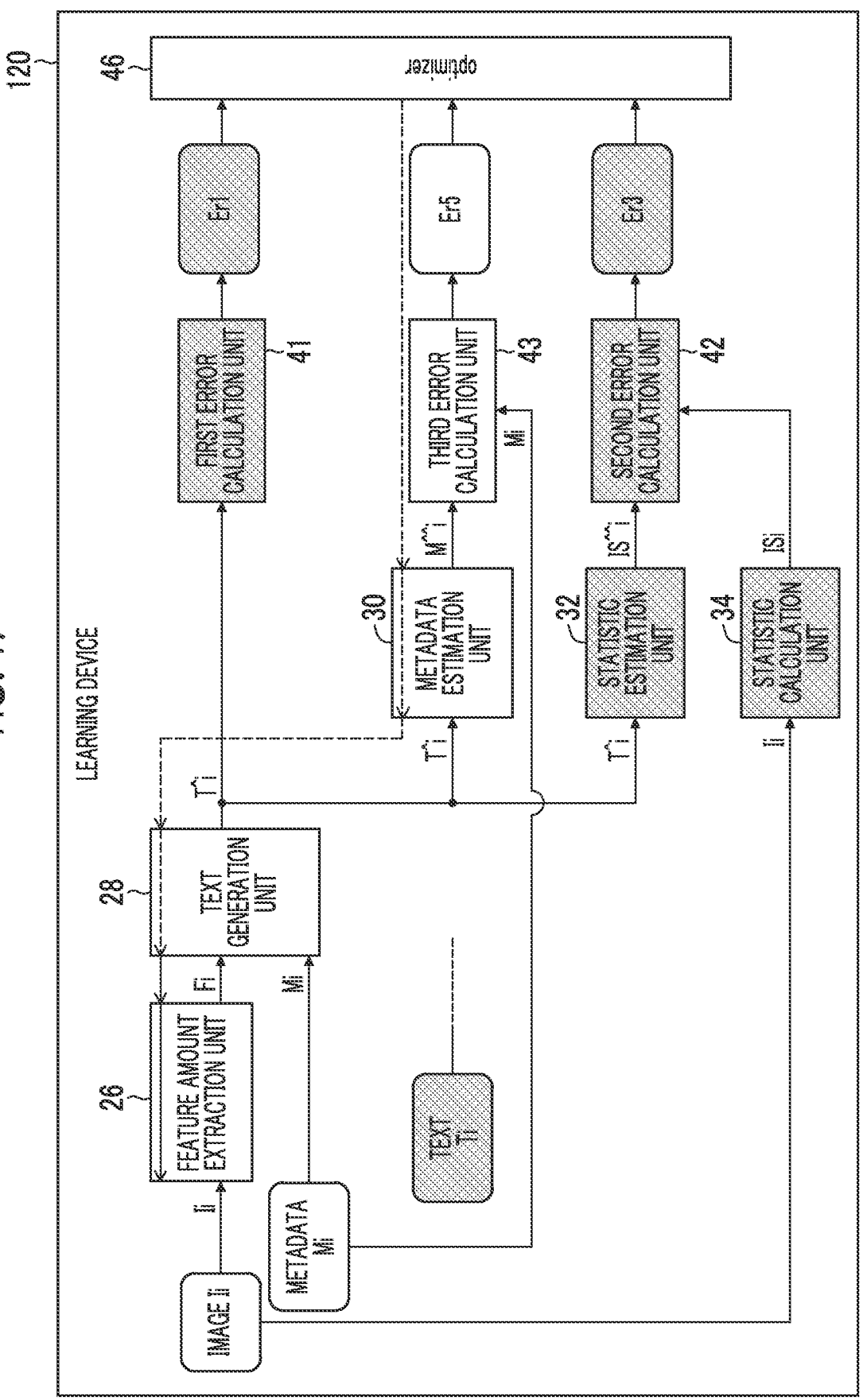
FIG. 17 is a block diagram schematically showing an aspect of processing of updating parameters of the text generation unit and the metadata estimation unit based on a fifth error calculated by the third error calculation unit of the learning device.

FIG. 17 is a block diagram schematically showing an aspect of the processing of updating the parameter of each of the metadata estimation unit 30 and the text generation unit 28 based on the fifth error calculated by the third error calculation unit 43. FIG. 17 shows an element, which is active in a case in which the parameters of the metadata estimation unit 30 and the text generation unit 28 are updated by operations of steps S15, S16, and S19A in FIG. 13, and a data flow.

Figure 18:
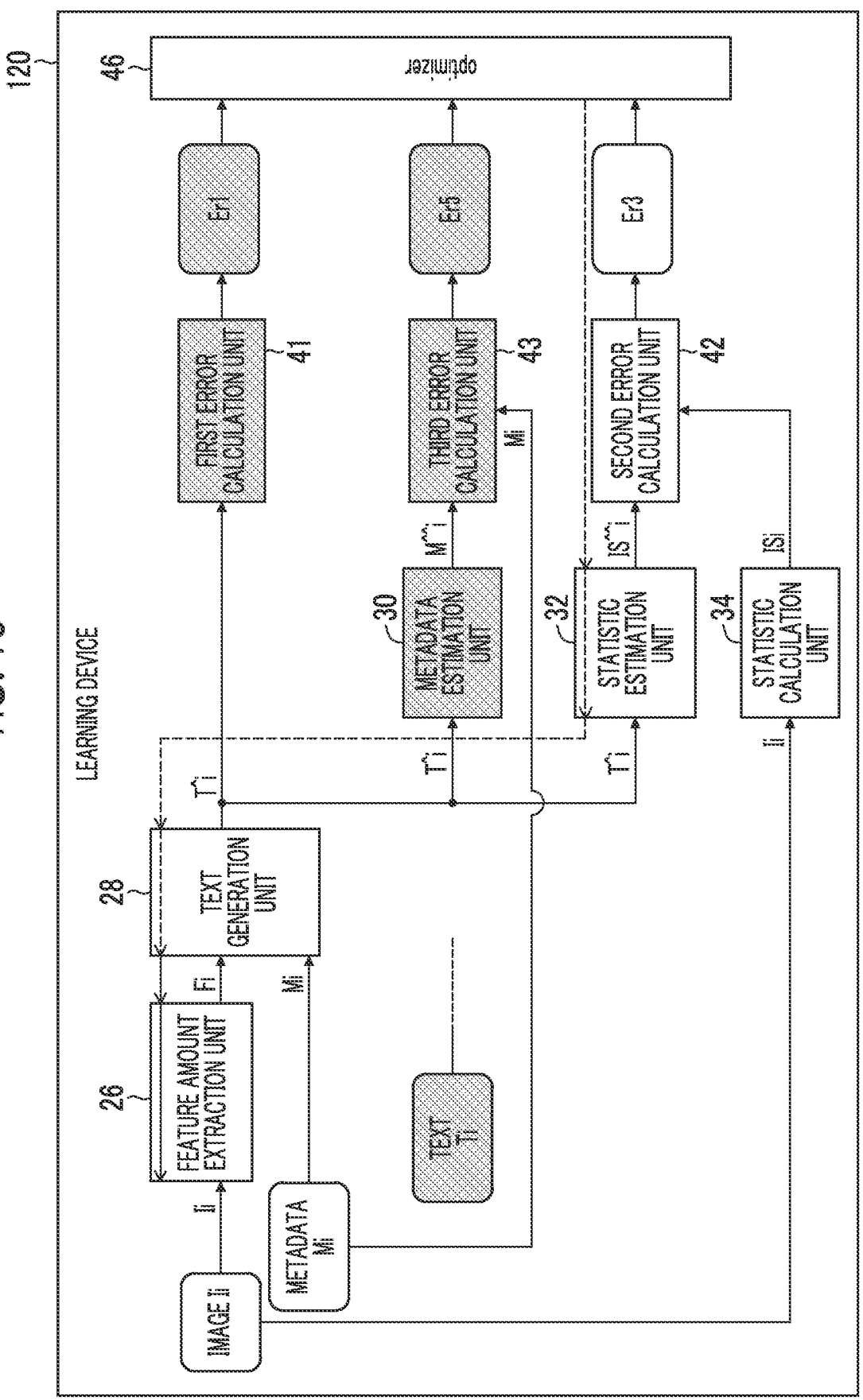
FIG. 18 is a block diagram schematically showing an aspect of processing of updating parameters of the text generation unit and the statistic estimation unit based on a third error calculated by the second error calculation unit of the learning device.

FIG. 18 is a block diagram schematically showing an aspect of the processing of updating the parameter of each of the metadata estimation unit 30 and the text generation unit 28 based on the third error calculated by the second error calculation unit 42. FIG. 18 shows an element, which is active in a case in which the parameters of the statistic estimation unit 32 and the text generation unit 28 are updated by operations of steps S17, S18, and S19A in FIG. 13, and a data flow. A display rule of each in FIGS. 14 to 18 is the same as the display rules in FIGS. 6 to 8.

In a case in which the processing shown in FIG. 14 is executed, the metadata estimation unit 30, the third error calculation unit 43, the statistic estimation unit 32, the statistic calculation unit 34, and the second error calculation unit 42 are inactive. The optimizer 46 updates the parameter of the text generation unit 28 based on the update amount of the parameter of the text generation unit 28 calculated based on the first error Er1.

In a case in which the processing shown in FIG. 15 is executed, the optimizer 46 updates the parameter of the metadata estimation unit 30 based on the update amount of the parameter of the metadata estimation unit 30 calculated based on the fourth error Er4.

In a case in which the processing shown in FIG. 16 is executed, the optimizer 46 updates the parameter of the statistic estimation unit 32 based on the update amount of the parameter of the statistic estimation unit 32 calculated based on the second error Er2.

In a case in which the processing shown in FIG. 17 is executed, the optimizer 46 updates the parameter of each of the metadata estimation unit 30 and the text generation unit 28 based on the update amount of the parameter of each of the metadata estimation unit 30 and the text generation unit 28 calculated based on the fifth error Er5. Regarding the update of the parameter based on the fifth error Er5, the optimizer 46 may update the parameter of the feature amount extraction unit 26 as in FIG. 14. Alternatively, the optimizer 46 may update only the parameter of the text generation unit 28 without updating the parameter of the metadata estimation unit 30 out of the metadata estimation unit 30 and the text generation unit 28 shown in FIG. 17.

In a case in which the processing shown in FIG. 18 is executed, the optimizer 46 updates the parameter of each of the statistic estimation unit 32 and the text generation unit 28 based on the update amount of the parameter of each of the statistic estimation unit 32 and the text generation unit 28 calculated based on the third error Er3. Regarding the update of the parameter based on the third error Er3, the optimizer 46 may update the parameter of the feature amount extraction unit 26 as in FIG. 14.

The update of the parameter of the text generation unit 28 is performed based on the first error Er1 shown in FIG. 14, the fifth error Er5 shown in FIG. 17, and the third error Er3 shown in FIG. 18.

Effect of Second Embodiment

According to the second embodiment, the image Ii and the text Ti are added as the learning data, and a combination including the metadata Mi including the attribute information of the user is used, so that a model which can realize highly accurate text generation by reflecting the attribute of the user can be learned efficiently. In addition, with the learning method according to the second embodiment, learning of the network of each of the text generation unit 28, the metadata estimation unit 30, and the statistic estimation unit 32 are performed in parallel, further, learning is performed by providing an input of the estimated text T^i output from the text generation unit 28 to the metadata estimation unit 30 and the statistic estimation unit 32, so that a more accurate estimated text can be generated. According to the second embodiment, it is possible to generate the caption which is close to the intention of the user.

In addition, according to the second embodiment, learning is performed by using the set of the learning data including the learning data of different users, so that a model having general-purpose properties, which can automatically generate the caption corresponding to the users having various attributes, can be obtained.

Application Example 1

The technology of the present disclosure can be applied, for example, as a service of a caption generation function as one of posting assistance functions associated with the SNS. The caption generation function is realized by the following procedure.

[Procedure 1-1] The user uploads the image for which the caption is to be generated to a system. The "system" herein is a computer system that provides a processing function for the caption generation. The system is hereinafter referred to as a "caption generation system". The caption generation system may be constructed integrally with the SNS system or may be constructed as an independent system.

[Procedure 1-2] The caption generation system analyzes the past input characters of the user and the image thereof from the contents posted by the user in the past. The "analysis" herein refers to generating the plurality of learning data by combining the metadata of the user, the input characters (text), and the images, and performing machine learning using the learning device 20. Note that the order of [Procedure 1-1] and [Procedure 1-2] described above can be exchanged.

[Procedure 1-3] A target image (uploaded image) is input into the caption generation device 10 including the learned text generation unit 28 obtained by the analysis (learning) of the procedure 1-2 to generate the caption. The generated caption is provided to the user.

System Configuration Example of Application Example 1

Figure 19:
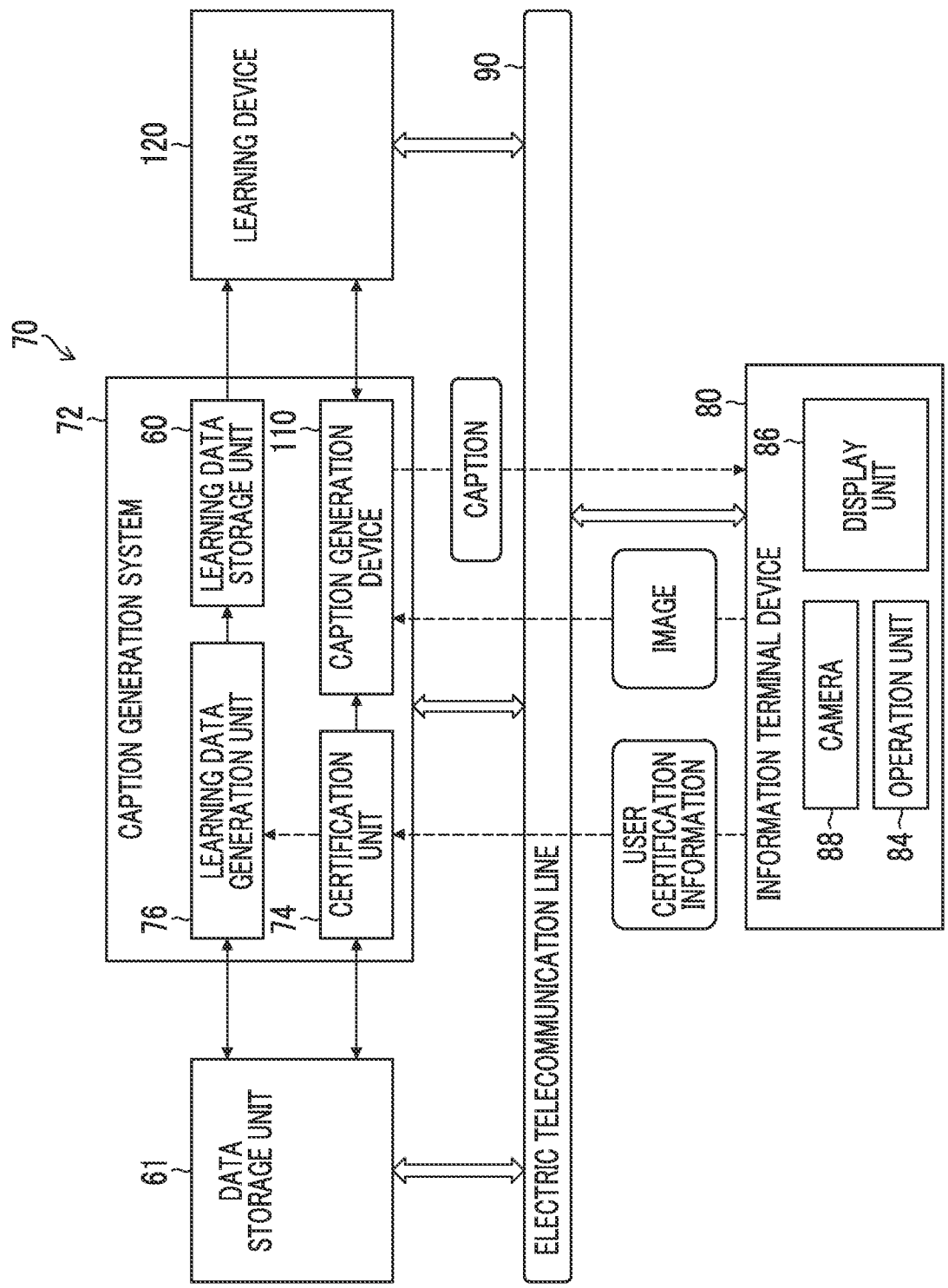
FIG. 19 is a block diagram showing an example of an overall configuration of a computer system that realizes a caption generation function according to Application Example 1.

FIG. 19 is a block diagram showing an example of an overall configuration of the computer system that realizes the caption generation function according to Application Example 1. A computer system 70 includes a data storage unit 61, a caption generation system 72, and the learning device 120. The data storage unit 61, the caption generation system 72, and the learning device 120 are connected to an electric telecommunication line 90 and can exchange data with each other. The electric telecommunication line 90 may be a wide area network such as the Internet. Each of the data storage unit 61, the caption generation system 72, and the learning device 120 comprises a communication unit (not shown) that is connected to the electric telecommunication line 90.

The data storage unit 61 includes a large-capacity storage in which the user information of each user, the past posted data, and the like are stored.

The caption generation system 72 includes a certification unit 74 that performs user certification, a learning data generation unit 76 that generates the learning data, the learning data storage unit 60, and the caption generation device 110. Note that the certification unit 74 may be provided outside the caption generation system 72.

The user can access the caption generation system 72 via the electric telecommunication line 90 by using an information terminal device 80. The information terminal device 80 may be a portable communication terminal such as a smartphone, or may be a personal computer and the like. The information terminal device 80 comprises a communication unit (not shown) that is connected to the electric telecommunication line 90.

The information terminal device 80 includes an operation unit 84 and a display unit 86, as a user interface. For example, the operation unit 84 is configured by a keyboard, a mouse, a touch panel, other pointing devices, a voice input device, or an appropriate combination thereof. For example, the display unit 86 is configured by a liquid crystal display, an organic electro-luminescence (OEL) display, a projector, or an appropriate combination thereof.

The information terminal device 80 may comprise a camera 88. The camera 88 includes an imaging optical system including a lens and an imaging device, which are not shown. The user can upload the image captured by the camera 88 and/or the image stored in an internal or external memory (not shown) of the information terminal device 80 to the caption generation system 72.

The certification unit 74 receives user certification information transmitted from the information terminal device 80 and executes user certification processing. The certification unit 74 specifies the user who receives an access request by collating with the registration information of the user registered in the data storage unit 61. The certification unit 74 transmits the user information related to the specified user to the learning data generation unit 76 and the caption generation device 110. The user information transmitted from the certification unit 74 to the learning data generation unit 76 and the caption generation device 110 includes the metadata of the user read out from the data storage unit 61. Alternatively, the learning data generation unit 76 and the caption generation device 110 may acquire the metadata of the user from the data storage unit 61 based on the information for specifying the user.

Figure 20:
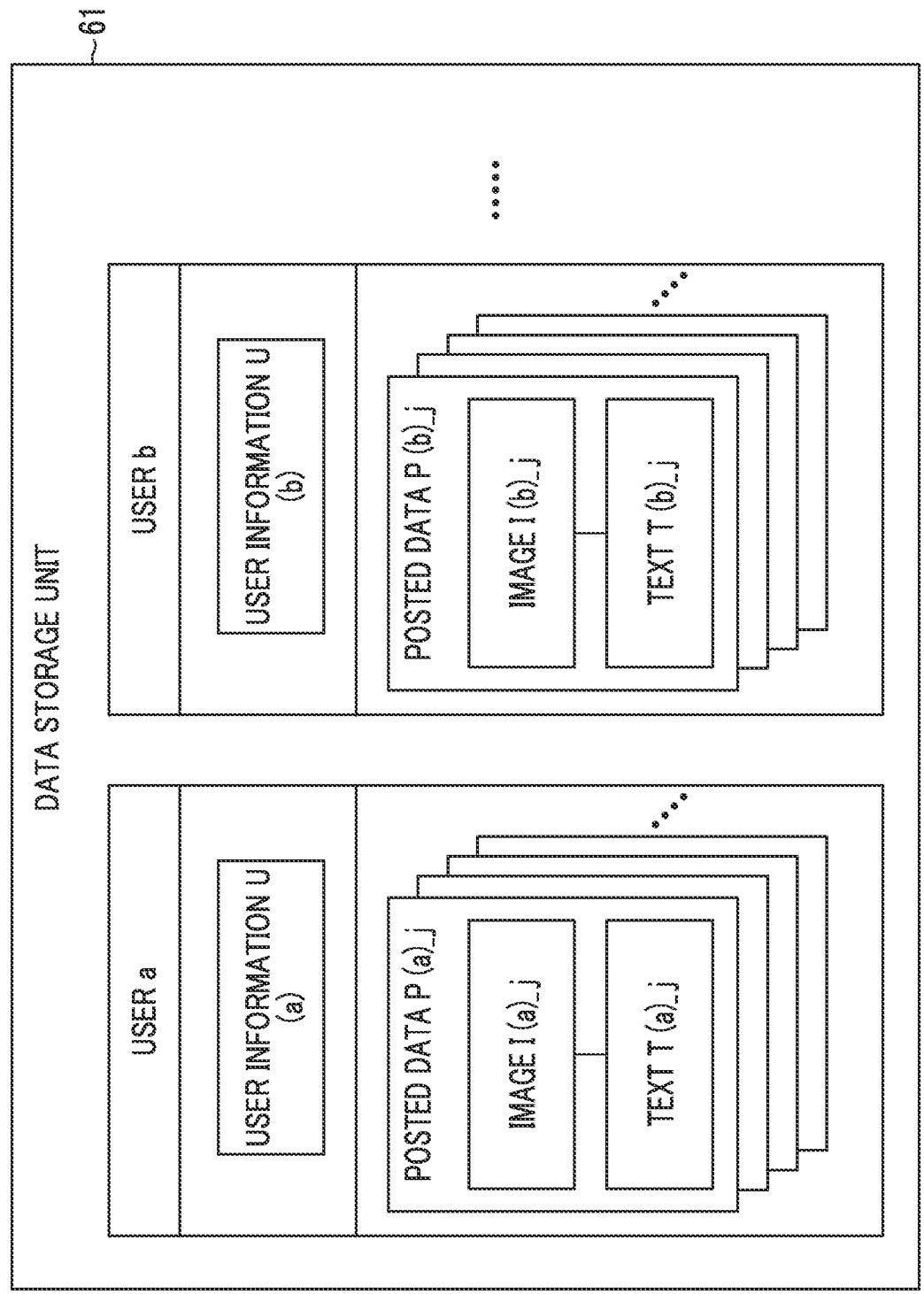
FIG. 20 is a conceptual diagram of data stored in a data storage unit.

FIG. 20 is a conceptual diagram of the data stored in the data storage unit 61. In the data storage unit 61, user information U(x) and past posted data P(x)_j are stored for each user in association with each other. x is an index for identifying the user, and j is an index for identifying the posted data. The posted data P(x)_j is constituted by a combination of an image I(x)_j and a text T(x)_j. The user information U(x) includes the metadata of the user. As shown in FIG. 20, past posted data P(a)_j posted by a user a is stored in association with user information U(a). Similarly, past posted data P(b)_j posted by a user b is stored in association with user information U(b).

The learning data generation unit 76 generates the learning data LDi from the data stored in the data storage unit 61. The learning data LDi is a combination of the image, the metadata, and the text, as described in FIG. 10. A set of learning data LDi generated by the learning data generation unit 76 is stored in the learning data storage unit 60. Note that the learning data storage unit 60 may be incorporated in the data storage unit 61.

The learning device 120 reads the learning data LDi from the learning data storage unit 60 to perform learning. The learning device 20 transmits a learned parameter obtained as a learning result to the caption generation device 110, and updates the text generation unit 18 of the caption generation device 110 by the learned parameter. As a result, the caption generation device 110 is equipped with the learned model (text generation unit 18) capable of generating the caption close to the intention of the user.

The caption generation device 110 generates the caption close to the intention of the user for the image uploaded by the user, and provides the generated caption to the user. The caption generated by the caption generation device 110 is transmitted to the information terminal device 80 via the electric telecommunication line 90 and displayed on the display unit 86.

The user may confirm the caption automatically generated by the caption generation device 110 and use the confirmed caption as it is for posting, or can add edition on the confirmed caption as needed.

With such a system, it is possible to reduce a text input work by the user in a case of adding the caption to the image.

In addition, by storing the learned parameter obtained by performing learning for a specific user in the data storage unit 61 in association with the user information, the learned parameter can be applied to the caption generation device 110 at the time of next access to omit the learning processing. Alternatively, the accuracy of the estimation can be improved by setting the learned parameter to an initial parameter at the time of learning in the learning device 120 and performing additional learning at the time of the next access.

Modification Example

The learning device 120 in FIG. 19 may be incorporated in the caption generation system 72. The learning data generation unit 76 may have an independent device configuration as a learning data generation device. The learned parameter incorporated in the caption generation device 10 may be provided to the information terminal device 80, and the caption generation device 110 may be constructed in the information terminal device 80.

Application Example 2

The technology of the present disclosure can be applied, for example, as a service of an email automatic reply function. The email automatic reply function is realized by the following procedure.

[Procedure 2-1] An email automatic reply system acquires the email of the user as the image. The "email of the user" herein is an email transmitted to a target user who uses this service, and is an email received by the target user. The user transmits (uploads) the received mail to the email automatic reply system. The email automatic reply system acquires an email image obtained by converting the uploaded email into image information.

[Procedure 2-2] The email automatic reply system analyzes the past input characters of the user and the email image thereof from the contents of the past transmitted email by the user. Note that the metadata of the user may be extracted in the processing of analysis.

[Procedure 2-3] A target image (here, image acquired in Procedure 2-1) is input into the caption generation device 110 including the learned text generation unit 28 obtained by the analysis (learning) of the procedure 2-2 to generate the caption, that is, a sentence of a reply candidate. Thereafter, the generated caption is provided to the user.

Since the system configuration of Application Example 2 is almost the same as that of Application Example 1, the description thereof will be omitted. According to Application Example 2, since the reply candidate having the writing style close to the intention of the user can be automatically generated, the work of creating the reply email can be reduced.

Other Application Examples

The technology of the present disclosure can be applied to various applications for creating the sentence on the image. For example, the technology of the present disclosure can be applied to the creation of an interpretation report in a medical field or the creation of a form in an infrastructure inspection. A user who creates the interpretation report is a radiologist, and a user who creates the form in the infrastructure inspection is a worker who performs an inspection work.

The image to which the caption is added is not limited to a still image, but may be a motion picture. In addition, the image may be a part of a frame image constituting the motion picture.

Distillation Model and Derived Model

It is possible to generate a derived model and/or a distillation model based on the learned model obtained by performing the learning method according to the present disclosure. The derived model is a derived learned model obtained by further performing additional learning on the learned model, and is also referred to as a "reuse model". The "additional learning" herein refers to generating a new learned parameter by applying a different data set for learning to the existing learned model and performing further learning. Additional learning is performed for the purpose of maintaining or improving the accuracy of the learned model, or adapting the learned model to a region different from a region originally learned, for example.

On the other hand, the "distillation" refers to generating a new learned model and/or learned parameter by using an input to the existing learned model and an output result with respect to the input as the data set for learning of a new model and performing machine learning. The "distillation model" refers to an inference program (inference model) in which the learned parameter newly generated by the distillation is incorporated. The "inference program" is a program that enables an output of a fixed result with respect to an input by applying the incorporated learned parameter. The distillation model may have a different network structure from that of an original learned model, and in general, the distillation model can have a smaller network structure than that of the original learned model.

It is possible to generate the derived model and/or the distillation model based on the learned model obtained by performing the learning method according to the present disclosure. Therefore, it is understood that a method of generating these derived model and/or distillation model and the obtained derived model and/or distillation model belong to the technical scope of the present disclosure.

Example of Hardware Configuration of Computer

Figure 21:
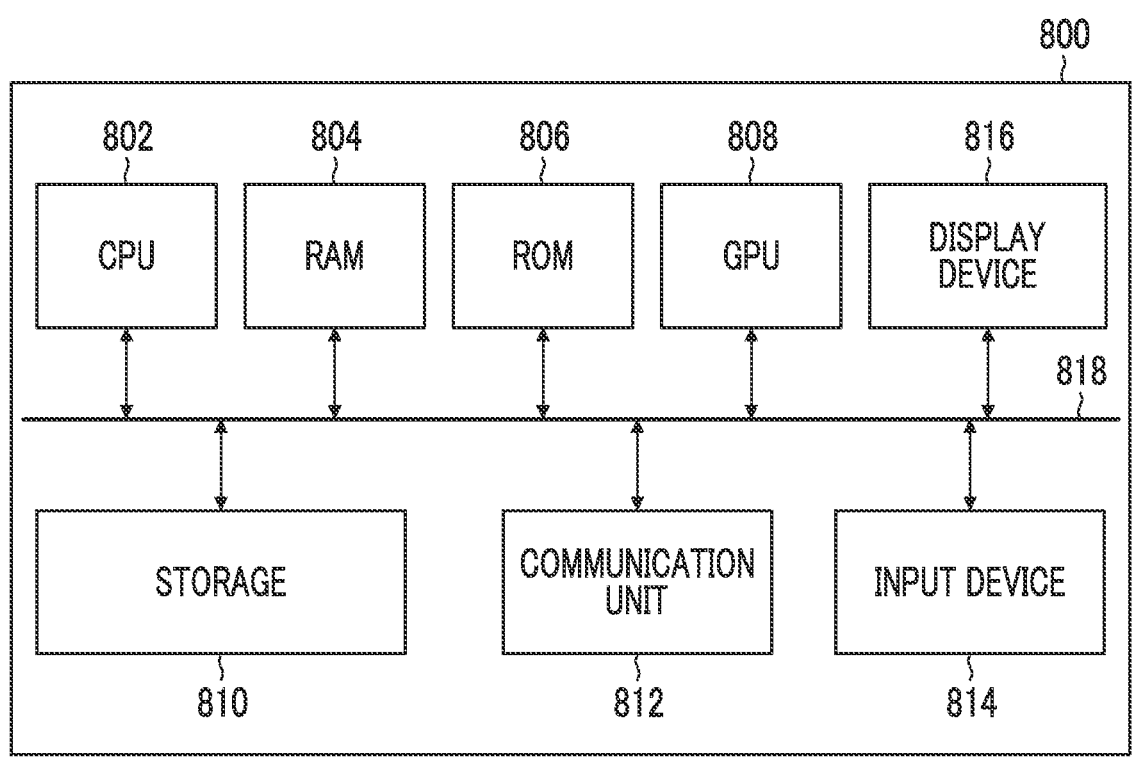
FIG. 21 is a block diagram showing an example of a hardware configuration of the computer.

FIG. 21 is a block diagram showing an example of a hardware configuration of the computer. A computer 800 may be a personal computer, a workstation, or a server computer. The computer 800 can be used as any one of the caption generation device 10, the learning device 20, the data storage unit 61, the caption generation system 72, or the information terminal device 80 described above, or a device having a plurality of functions thereof.

The computer 800 comprises a central processing unit (CPU) 802, a random access memory (RAM) 804, a read only memory (ROM) 806, a graphics processing unit (GPU) 808, a storage 810, a communication unit 812, an input device 814, a display device 816, and a bus 818. Note that the graphics processing unit (GPU) 808 need only be provided as needed, and may be omitted in a case in which a calculation load is not large.

The CPU 802 reads out various programs stored in the ROM 806, the storage 810, or the like, and executes various pieces of processing. The RAM 804 is used as a work region of the CPU 802. In addition, the RAM 804 is used as a storage unit that temporarily stores the readout program and various data.

The storage 810 is configured to include, for example, a hard disk apparatus, an optical disk, a magneto-optical disk, or a semiconductor memory, or a storage device configured by using an appropriate combination thereof. The storage 810 stores various programs, data, and the like required for the image processing such as the learning processing and/or the image generation processing. The program stored in the storage 810 is loaded into the RAM 804, and the CPU 802 executes the program, so that the computer functions as means for executing various pieces of processing specified by the program.

The communication unit 812 is an interface which executes communication processing with an external device by wire or wirelessly, and performs exchange of the information with the external device.

The input device 814 is an input interface which receives various operation inputs with respect to the computer 800. For example, the input device 814 may be a keyboard, a mouse, a touch panel, other pointing devices, a voice input device, or an appropriate combination thereof.

The display device 816 is an output interface on which various types of information are displayed. For example, the display device 816 may be a liquid crystal display, an organic electro-luminescence (OEL) display, a projector, or an appropriate combination thereof.

About Program Causing Computer to Operate

The program that causes the computer to realize a part or all of at least one processing function of the learning function, the caption generation function, or the learning data generation function described in each of the above embodiments can be recorded on the computer-readable medium which is the tangible non-transitory information storage medium such as the optical disk, the magnetic disk, the semiconductor memory, or other objects, and the program can be provided through the information storage medium.

In addition, instead of the aspect in which the program is stored in such a tangible non-transitory information storage medium and provided, the program signal can be provided as a download service by using the electric telecommunication line such as the Internet.

In addition, a part or all of at least one processing function of the learning function, the caption generation function, or the learning data generation function described in the embodiment is provided as an application server, and services that provide the processing function can be performed through the electric telecommunication line.

About Hardware Configuration of Each Processing Unit

The hardware structures of the processing units that execute various pieces of processing, such as the image acquisition unit 12, the metadata acquisition unit 14, the feature amount extraction unit 16, and the text generation unit 18 in FIGS. 1 and 9, the learning data storage unit 60, the data acquisition unit 22, the feature amount extraction unit 26, the text generation unit 28, the metadata estimation unit 30, the statistic estimation unit 32, the statistic calculation unit 34, the first error calculation unit 41, the second error calculation unit 42, the third error calculation unit 43, and the optimizer 46 in FIGS. 2 and 10, the data storage unit 61, the certification unit 74, and the learning data generation unit 76 in FIG. 19, are the following various processors, for example.

The various processors include the CPU that is a general-purpose processor executing the program and functioning as the various processing units, the GPU that is a processor specialized in the image processing, a programmable logic device (PLD) that is a processor whose circuit configuration can be changed after manufacture, such as a field programmable gate array (FPGA), and a dedicated electric circuit that is a processor having a circuit configuration that is designed for exclusive use in order to execute specific processing, such as an application specific integrated circuit (ASIC).

One processing unit may be configured by one of these various processors or may be configured by two or more processors of the same type or different types. For example, one processing unit may be configured by a plurality of FPGAs, a combination of the CPU and the FPGA, or a combination of the CPU and the GPU. Alternatively, a plurality of processing units may be configured by one processor. As an example of the configuration of a plurality of processing units with one processor, first, as represented by a computer such as a client or a server, there is a form in which one processor is configured by a combination of one or more CPUs and the software and the processor functions as a plurality of processing units. Second, as represented by a system on chip (SoC), there is a form in which a processor is used in which the function of the entire system including a plurality of processing units is realized by a single integrated circuit (IC) chip. As described above, the various processing units are configured by one or more of the above various processors as a hardware structure.

Furthermore, the hardware structure of these various processors is, more specifically, an electric circuit (circuitry) in which the circuit elements such as semiconductor elements are combined.

Others

The matters described in the configuration or the modification example described in the embodiment described above can be used in combination as appropriate, and a part of the matters can be replaced.

It is needless to say that the present invention is not limited to the embodiment described above and various modifications can be made without departing from the spirit of the present invention.

EXPLANATION OF REFERENCES

10: caption generation device
12: image acquisition unit
14: metadata acquisition unit
16: feature amount extraction unit
18: text generation unit
20: learning device
22: data acquisition unit
26: feature amount extraction unit
28: text generation unit
30: metadata estimation unit
32: statistic estimation unit
34: statistic calculation unit
41: first error calculation unit
42: second error calculation unit
43: third error calculation unit
46: optimizer
60: learning data storage unit
61: data storage unit
70: computer system
72: caption generation system
74: certification unit
76: learning data generation unit
80: information terminal device
84: operation unit
86: display unit
88: camera
90: electric telecommunication line
110: caption generation device
120: learning device
800: computer
802: CPU
804: RAM
806: ROM
808: GPU
810: storage
812: communication unit
814: input device
816: display device
818: bus
Er1: first error
Er2: second error
Er3: third error
Er4: fourth error
Er5: fifth error
I: image
Ii: image
Fi: image feature amount
IMG: image
ISi: image statistic
IS^i: estimated image statistic
IS^^N: estimated image statistic
LDi: learning data
MTD: metadata
Mi: metadata
M→i: estimated metadata
M→→N: estimated metadata
Ti: text
PTX: estimated text
T→i: estimated text
U(x): user information
P(x)_j: posted data
S1 to S9, S1A, S9A, S15 to S20, S19A: steps of learning method

What is claimed is:

1. A learning method comprising:
using a learning model including a feature amount extraction unit that extracts an image feature amount from an image, a text generation unit that generates an estimated text related to the image based on the image feature amount, and a statistic estimation unit that receives an input of the estimated text or a correct text and generates an estimated image statistic by estimating an image statistic from the input of the estimated text or the correct text, wherein the image statistic is capable of being calculated, separately from a learning model, from the image corresponding to the input of the estimated text or the correct text, and includes at least one of an average value of color components of red (R), green (G), blue (B), a color distribution, and a color histogram in the image;
receiving an input of a plurality of learning data in which a first image for learning and a first text as the correct text for the first image are combined;

inputting the first image into the feature amount extraction unit to acquire a first image feature amount;
inputting the first image feature amount into the text generation unit to acquire a first estimated text;
calculating a first error between the first estimated text and the first text;
inputting the first text into the statistic estimation unit to acquire a first estimated image statistic;
calculating a second error between the first estimated image statistic and a first image statistic, wherein the first image statistic is calculated from the first image separately from the learning model;
inputting the first estimated text into the statistic estimation unit to acquire a second estimated image statistic;
calculating a third error between the second estimated image statistic and the first image statistic;
updating a parameter of the statistic estimation unit based on the second error; and
updating at least a parameter of the text generation unit based on the first error and the third error.

2. The learning method according to claim 1, further comprising:
updating a parameter of the feature amount extraction unit based on the first error.

3. The learning method according to claim 1,
wherein the learning model is constituted by a hierarchical neural network.

4. A non-transitory computer-readable recording medium on which a program for causing a computer to execute the learning method according to claim 1 is recorded.

5. A learned model, which is the learned text generation unit learned by using the learning method according to claim 1.

6. A text generation device comprising:
the learned text generation unit learned by using the learning method according to claim 1, and
the feature amount extraction unit.

7. A learning method comprising:
using a learning model including a feature amount extraction unit that extracts an image feature amount from an image, a text generation unit that generates an estimated text related to the image based on the image feature amount, and a statistic estimation unit that receives an input of the estimated text or a correct text, estimates an image statistic corresponding to the input text, and generates an estimated image statistic;
receiving an input of a plurality of learning data in which a first image for learning and a first text as the correct text for the first image are combined;
inputting the first image into the feature amount extraction unit to acquire a first image feature amount;
inputting the first image feature amount into the text generation unit to acquire a first estimated text;
calculating a first error between the first estimated text and the first text;
inputting the first text into the statistic estimation unit to acquire a first estimated image statistic;
calculating a second error between the first estimated image statistic and a first image statistic calculated from the first image;
inputting the first estimated text into the statistic estimation unit to acquire a second estimated image statistic;
calculating a third error between the second estimated image statistic and the first image statistic;
updating a parameter of the statistic estimation unit based on the second error; and
updating at least a parameter of the text generation unit based on the first error and the third error,
wherein the text generation unit is a module that generates the estimated text from the image feature amount and metadata related to a user associated with the image,
the learning model further includes a metadata estimation unit that receives an input of the estimated text or the first text, estimates metadata of the user corresponding to the input text, and generates estimated metadata,
the learning data further includes first metadata related to a first user associated with the first image,
the first image feature amount and the first metadata are input into the text generation unit to acquire the first estimated text,
the learning method further comprises:
inputting the first text into the metadata estimation unit to acquire first estimated metadata;
calculating a fourth error between the first estimated metadata and the first metadata;
updating a parameter of the metadata estimation unit based on the fourth error;
inputting the first estimated text into the metadata estimation unit to acquire second estimated metadata; and
calculating a fifth error between the second estimated metadata and the first metadata, and
at least the parameter of the text generation unit is updated based on the fifth error.

8. The learning method according to claim 7,
wherein the first user corresponds to at least one of a photographer of the image, a creator thereof, a contributor thereof, a provider thereof, or an owner thereof, and
the first metadata includes information indicating an attribute of the first user.

9. The learning method according to claim 7,
wherein the first text includes a sentence created by the first user.

10. The learning method according to claim 7,
wherein the first image is an image posted to a social networking service by the first user,
the first text is a sentence posted to the social networking service by the first user, and
the first metadata includes at least a part of user information of the first user registered in the social networking service.

11. The learning method according to claim 7,
wherein the first image is an image obtained by converting an email received by the first user into image information, and
the first text includes a sentence of an email transmitted by the first user.

12. A learning device comprising:
a learning data acquisition unit that receives an input of a plurality of learning data in which a first image for learning and a first text as a correct text for the first image are combined;
a learning model trained by the learning data, the learning model including a feature amount extraction unit that extracts an image feature amount from an input image, a text generation unit that generates an estimated text related to the image based on the image feature amount, and a statistic estimation unit that receives an input of the estimated text or the correct text and generates an estimated image statistic by estimating an image statistic from the input of the estimated text or the correct text, wherein the image statistic is capable of being calculated, separately from a learning model, from the image corresponding to the input of the estimated text or the correct text, and includes at least one of an average value of color components of red (R), green (G), blue (B), a color distribution, and a color histogram in the image;

a first error calculation unit that inputs, into the text generation unit, a first image feature amount obtained from the feature amount extraction unit by inputting the first image into the feature amount extraction unit to calculate a first error between a first estimated text obtained from the text generation unit and the first text;

a second error calculation unit that calculates a second error between a first estimated image statistic obtained from the statistic estimation unit by inputting the first text into the statistic estimation unit and a first image statistic, wherein the first image statistic is calculated from the first image separately from the learning model, and calculates a third error between a second estimated image statistic obtained from the statistic estimation unit by inputting the first estimated text into the statistic estimation unit and the first image statistic; and a parameter update unit that updates parameters of the text generation unit and the statistic estimation unit based on the first error and the second error, and updates at least a parameter of the text generation unit based on the third error.

13. A learning device comprising:

a learning data acquisition unit that receives an input of a plurality of learning data in which a first image for learning and a first text as a correct text for the first image are combined;

a learning model trained by the learning data, the learning model including a feature amount extraction unit that extracts an image feature amount from an input image, a text generation unit that generates an estimated text related to the image based on the image feature amount, and a statistic estimation unit that receives an input of the estimated text or the first text, estimates an image statistic corresponding to the input text, and generates an estimated image statistic;

a first error calculation unit that inputs, into the text generation unit, a first image feature amount obtained from the feature amount extraction unit by inputting the first image into the feature amount extraction unit to calculate a first error between a first estimated text obtained from the text generation unit and the first text;

a second error calculation unit that calculates a second error between a first estimated image statistic obtained from the statistic estimation unit by inputting the first text into the statistic estimation unit and a first image statistic calculated from the first image, and calculates a third error between a second estimated image statistic obtained from the statistic estimation unit by inputting the first estimated text into the statistic estimation unit and the first image statistic; and a parameter update unit that updates parameters of the text generation unit and the statistic estimation unit based on the first error and the second error, and updates at least a parameter of the text generation unit based on the third error, wherein the text generation unit is a module that generates the estimated text from the image feature amount and metadata related to a user associated with the image, the learning model further includes a metadata estimation unit that receives an input of the estimated text or the first text, estimates metadata of the user corresponding to the input text, and generates estimated metadata, the learning data further includes first metadata related to a first user associated with the first image, the first image feature amount and the first metadata are input into the text generation unit to acquire the first estimated text, the learning device further comprises a third error calculation unit that calculates a fourth error between a first estimated metadata obtained from the metadata estimation unit by inputting the first text into the metadata estimation unit and the first metadata, and calculates a fifth error between a second estimated metadata obtained from the metadata estimation unit by inputting the first estimated text into the metadata estimation unit and the first image statistic, and the parameter update unit updates a parameter of the metadata estimation unit based on the fourth error, and updates at least the parameter of the text generation unit based on the fifth error.

\* \* \* \* \*